US012159437B2

(12) United States Patent
Yang et al.

(10) Patent No.: US 12,159,437 B2
(45) Date of Patent: Dec. 3, 2024

(54) PARTITIONING METHOD, ENCODER, DECODER AND COMPUTER STORAGE MEDIUM

(71) Applicant: GUANGDONG OPPO MOBILE TELECOMMUNICATIONS CORP., LTD., Guangdong (CN)

(72) Inventors: Fuzheng Yang, Guangdong (CN); Zexing Sun, Guangdong (CN); Lihui Yang, Guangdong (CN); Shuai Wan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 333 days.

(21) Appl. No.: 17/810,509

(22) Filed: Jul. 1, 2022

(65) Prior Publication Data
US 2022/0343550 A1 Oct. 27, 2022

Related U.S. Application Data

(63) Continuation of application No. PCT/CN2020/070554, filed on Jan. 6, 2020.

(51) Int. Cl.
*G06T 9/00* (2006.01)
*G06F 5/01* (2006.01)
*G06F 7/24* (2006.01)

(52) U.S. Cl.
CPC ............... *G06T 9/001* (2013.01); *G06F 5/01* (2013.01); *G06F 7/24* (2013.01)

(58) Field of Classification Search
None
See application file for complete search history.

(56) References Cited

U.S. PATENT DOCUMENTS

2006/0041818 A1* 2/2006 Rao ................... H04L 1/0009
714/755
2018/0268570 A1* 9/2018 Budagavi ............... G06T 9/001
(Continued)

FOREIGN PATENT DOCUMENTS

| CN | 109889840 A | 6/2019 |
| CN | 108632621 B | 7/2019 |

(Continued)

OTHER PUBLICATIONS

Notice of Reasons for Refusal of the Japanese application No. 2022-540811, issued on Feb. 6, 2024. 4 pages with English translation.

(Continued)

*Primary Examiner* — Delomia L Gilliard
(74) *Attorney, Agent, or Firm* — PERKINS COIE LLP

(57) ABSTRACT

Disclosed are a partitioning method, an encoder, a decoder and a computer storage medium. The method includes: determining location information of a point of a point cloud to be partitioned; when i is less than or equal to M−1, determining right-shift number $N_i$ of ith LOD layer in the point cloud, M representing a preset maximum quantity of layers for LOD partitioning; for the ith LOD layer, shifting location information of the point rightwards by $N_i$-digit, performing storing in a preset storage area based on right-shifted location information; determining location information of a parent point corresponding to a current point in the ith LOD layer; according to determined location information of the parent point, searching the preset storage area for a neighbor point of the parent point; partitioning the current point into an (i+1)th LOD layer, or the neighbor point into the ith LOD layer.

18 Claims, 9 Drawing Sheets

(56) References Cited

U.S. PATENT DOCUMENTS

| | | | |
|---|---|---|---|
| 2019/0080483 A1 | 3/2019 | Mammou et al. | |
| 2019/0087978 A1* | 3/2019 | Tourapis | G06T 3/08 |
| 2019/0228050 A1 | 7/2019 | Chou et al. | |
| 2020/0027248 A1 | 1/2020 | Verschaeve et al. | |
| 2021/0329055 A1* | 10/2021 | Hur | H04L 65/61 |
| 2022/0108494 A1* | 4/2022 | Li | G06T 17/00 |
| 2022/0327742 A1* | 10/2022 | Oh | G06T 17/00 |

FOREIGN PATENT DOCUMENTS

| | | |
|---|---|---|
| CN | 110418135 A | 11/2019 |
| CN | 110580250 A | 12/2019 |
| WO | 2019078000 A1 | 4/2019 |
| WO | 2020264553 A1 | 12/2020 |
| WO | 2021062736 A1 | 4/2021 |

OTHER PUBLICATIONS

Khaled Mammou and Philip A. Chou, David Flynn and Maja Krivokuca, Ohji Nakagami and ToshiyasuSugio and G-PCC codec description v2 and Coding of Moving Pictures and Audio, ISO/IEC JTC1/SC29/WG11 N18189, InternationalOrganisation are for Standardisation, Jan. 2019, 39 pages.

International Search Report issued Oct. 12, 2020 of PCT/CN2020/070554 (4 pages).

Mammou, K., et al., ISO/IEC JTC1/SC29/WG11 MPEG2018/m43781—Jul. 2018, Ljubjana, Slovenia—Apple Inc., Efficient implementation of the Lifting Scheme in TMC13 (108 pages).

Written Opinion of the International Searching Authority, mailed Oct. 12, 2020 of PCT/CN2020/070554 (7 pages).

* cited by examiner

PARTITIONING METHOD, ENCODER, DECODER AND COMPUTER STORAGE MEDIUM

CROSS-REFERENCE TO RELATED APPLICATION

The present application is a continuation application of International PCT Application No. PCT/CN2020/070554, filed on Jan. 6, 2020, the entire content of which is hereby incorporated by reference.

TECHNICAL FIELD

Embodiments of the present application relate to a Level of Detail (LOD) partition technology in the technical field of video encoding and decoding, in particular to a partitioning method, an encoder, a decoder and a computer storage medium.

BACKGROUND

In a Geometry-based Point Cloud Compression (G-PCC) encoder framework, geometric information of a point cloud and attribute information corresponding to each point cloud are encoded separately. After geometric encoding is completed, the geometric information is reconstructed, and encoding of the attribute information will depend on the reconstructed geometric information. Herein, the encoding of the attribute information is mainly for encoding of color information. In the encoding of the color information, there are mainly two transform modes, one is a distance-based lifting transform in which Level of Detail (LOD) partitioning is performed, and the other is a Region Adaptive Hierarchical Transform (RAHT) which is directly performed. According to any one of the two modes, color information is converted from a spatial domain to a frequency domain, high-frequency and low-frequency coefficients are obtained through the transform, and finally the coefficients are quantized and encoded to generate a binary bitstream.

At present, when LOD partitioning is performed on a point cloud based on distance, the computational complexity is high in one aspect, while the neighbor nodes obtained by searching are not accurate enough due to incomplete considerations. Thereby prediction residuals are larger, and the number of encoding bits are increased, reducing the encoding efficiency.

SUMMARY

The embodiments of the present application provide a partitioning method, an encoder, a decoder, and a computer storage medium, which can improve the accuracy of prediction attributes of neighbor nodes, and the encoding bit overheads can be effectively reduced, thereby increasing encoding and decoding efficiency.

Technical solutions of the embodiments of the present application may be implemented as follows.

In a first aspect, an embodiment of the present application provides a partitioning method, which is applied to an encoder or a decoder, the method includes: a Morton code of a point of the point cloud to be partitioned is calculated according to a point cloud to be partitioned; a right shift number $N_i$ corresponding to an ith Level of Detail (LOD) layer in the point cloud to be partitioned is determined; wherein i is an integer greater than or equal to 0, and $N_i$ is an integer greater than 0; whether i is less than or equal to M−1 is judged; wherein M represents a preset quantity of layers of LOD partitioning; when i is less than or equal to M−1, for the ith LOD layer, right shift of the Morton code of the point of the point cloud to be partitioned is performed by $N_i$ binary digits, and the right-shifted Morton code is stored in a preset storage area; a Morton code of a parent node corresponding to a current node in the ith LOD layer is determined; according to the determined Morton code of the parent node, a preset storage area is searched for a neighbor node corresponding to the parent node; the current node is partitioned into the ith LOD layer, and the neighbor node is partitioned into an (i+1)th LOD layer; i is updated according to i+1, and it is returned to the act of judging whether i is less than or equal to M−1; and when i is greater than M−1, an 0th LOD layer to an M−1th LOD layer are determined as corresponding partitioned LOD layers of the point cloud to be partitioned.

In a second aspect, an embodiment of the present application provides an encoder including a first calculation unit, a first determining unit, a first judging unit, a first right shift unit, a first searching unit and a first partitioning unit.

The first calculation unit is configured to calculate a Morton code of a point of a point cloud to be partitioned based on the point cloud to be partitioned.

The first determining unit is configured to determine a right shift number $N_i$ corresponding to an ith Level of Detail (LOD) layer in the point cloud to be partitioned, where i is an integer greater than or equal to 0 and $N_i$ is an integer greater than 0.

The first judging unit is configured to judge whether i is less than or equal to M−1, where M represents a preset quantity of layers of LOD partitioning.

The first right shift unit is configured to, for the ith LOD layer, perform right shift of the Morton code of the point of the point cloud to be partitioned by $N_i$ binary digits when i is less than or equal to M−1, and stores the right-shifted Morton code in a preset storage area.

The first determining unit is further configured to determine a Morton code of a parent node corresponding to a current node in the ith LOD layer.

The first searching unit is configured to search a preset storage area for a neighbor node corresponding to the parent node according to the determined Morton code of the parent node.

The first partitioning unit is configured to partition the current node into an ith LOD layer and partition the neighbor node into an (i+1)th LOD layer.

The first judging unit is configured to update i according to i+1, and return to judge whether i is smaller than or equal to M−1.

The first determining unit is further configured to determine an 0th LOD layer to an (M−1)th LOD layer as corresponding partitioned LOD layers of the point cloud to be partitioned when i is greater than M−1.

In a third aspect, an embodiment of the present application provides an encoder including a first memory and a first processor, wherein the first memory is configured to store a computer program capable of running on the first processor; and the first processor is configured to perform the method according to the first aspect when the computer program is running.

In a fourth aspect, an embodiment of the present application provides a decoder including a second calculation unit, a second determining unit, a second judging unit, a second right shift unit, a second searching unit and a second partitioning unit.

The second calculation unit is configured to calculate a Morton code of a point of a point cloud to be partitioned based on the point cloud to be partitioned.

The second determining unit is configured to determine a right shift number $N_i$ corresponding to an ith Level of Detail (LOD) layer in the point cloud to be partitioned, where i is an integer greater than or equal to 0 and $N_i$ is an integer greater than 0.

The second judging unit is configured to judge whether i is less than or equal to M−1, where M represents a preset quantity of layers of LOD partitioning.

The second right shift unit is configured to, for the ith LOD layer, perform right shift of the Morton code of the point of the point cloud to be partitioned by $N_i$ binary digits when i is less than or equal to M−1, and store the right-shifted Morton code in a preset storage area.

The second determining unit is further configured to determine a Morton code of a parent node corresponding to a current node in the ith LOD layer.

The second searching unit is configured to search a preset storage area for a neighbor node corresponding to the parent node according to the determined Morton code of the parent node.

The second partitioning unit is configured to partition the current node into the ith LOD layer and partition the neighbor node into an (i+1)th LOD layer.

The second judging unit is further configured to update i according to i+1 and return to judge whether i is less than or equal to M−1.

The second determining unit is further configured to determine an 0th LOD layer to an (M−1)th LOD layer as corresponding partitioned LOD layers of the point cloud to be partitioned when i is greater than M−1.

In a fifth aspect, an embodiment of the present application provides a decoder including a second memory and a second processor, wherein the second memory is configured to store a computer program capable of running on the second processor; and the second processor is configured to perform the method according to the second aspect when the computer program is running.

In a sixth aspect, an embodiment of the present application provides a computer-readable storage medium having stored therein a computer program, wherein when the computer program is performed by a first processor, the method as described in the first aspect is implemented, and when the computer program is performed by a second processor, the method as described in the first aspect is implemented.

The embodiments of the present application provide a partitioning method, an encoder, a decoder, and a computer storage medium. A Morton code of a point of a point cloud to be partitioned is calculated according to a point cloud to be partitioned; a right shift number $N_i$ corresponding an ith Level of Detail (LOD) layer in the point cloud to be partitioned is determined, where i is an integer greater than or equal to 0, and $N_i$ is an integer greater than 0; whether i is less than or equal to M−1 is judged, where M represents a preset quantity of layers of LOD partitioning; when i is less than or equal to M−1, for the ith LOD layer, right shift of the Morton code of the point of the point cloud to be partitioned is performed by $N_i$ binary digits, and the right-shifted Morton code is stored in a preset storage area; a Morton code of a parent node corresponding to a current node in the ith LOD layer is determined; according to the determined Morton code of the parent node, a preset storage area is searched for a neighbor node corresponding to the parent node; the current node is partitioned into the ith LOD layer, and the neighbor node is partitioned into an (i+1)th LOD layer; i is updated according to i+1, and it is returned to the act of judging whether i is less than or equal to M−1; and when i is greater than M−1, an 0th LOD layer to an (M−1)th LOD layer are determined as corresponding partitioned LOD layers of the point cloud to be partitioned. Thus, the technical solution of the present application no longer calculates the spatial distances between the current node and the neighbor nodes, but uses Morton codes to search for the neighbor nodes corresponding to the parent nodes of the current node every time the LOD layer is partitioned. In addition, the current node is used as a sample to predict the neighbor node, which reduces the computational complexity. Moreover, since the spatial distribution characteristics of the point cloud are considered, the accuracy of the neighbor node's prediction attribute and the reconstruction quality of the attribute part are also improved, which can effectively reduce the encoding bit overheads and further increase the encoding and decoding efficiency.

DETAILED DESCRIPTION

In order to understand features and technical contents of embodiments of the present application in more detail, implementations of the embodiments of the present application will be described in detail below in combination with the accompanying drawings, which are for reference only and are not intended to limit the embodiments of the present application.

In a G-PCC encoder framework for a point cloud, after a point cloud of an input three-dimensional (3D) picture model is partitioned into slices, each slice is independently encoded.

Figure 1:
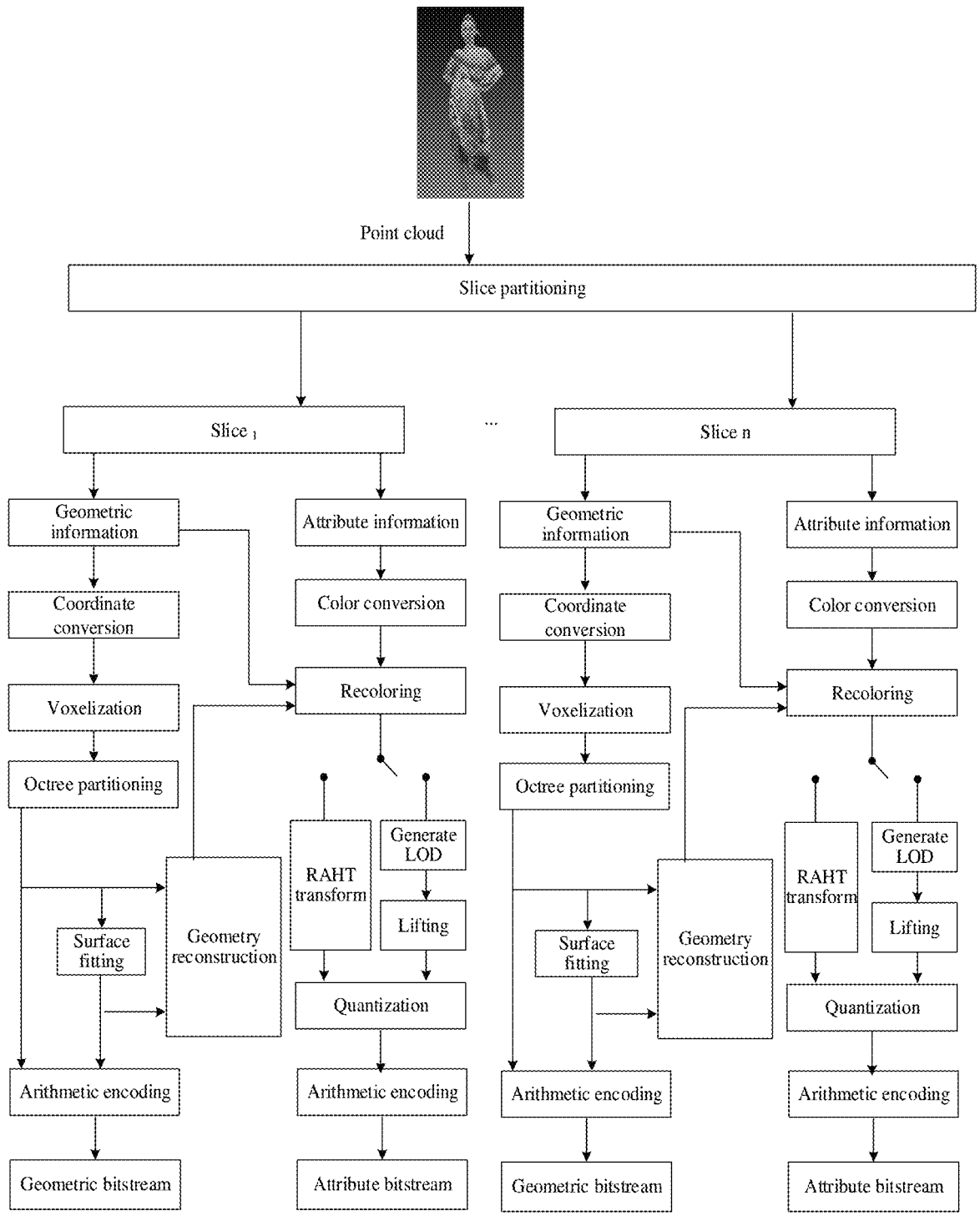
FIG. 1 is a flow block diagram of G-PCC encoding according to a related technical solution.

Referring to FIG. 1, FIG. 1 shows a flow block diagram of G-PCC encoding according to a related technical solution. In the flow block diagram of the G-PCC encoding as shown in FIG. 1, which is applied to a point cloud encoder, point cloud data to be encoded is first partitioned into multiple slices through slice partitioning. In each slice, geometric information of the point cloud and attribute information corresponding to each point cloud are encoded separately. In a process of geometry encoding, coordinate conversion is first performed on geometric information, so that the whole point cloud is contained in a bounding box, and then quantization is performed on the point cloud. The quantization in this act mainly plays a role of scaling. Because of quantization rounding, geometric information of a part of the point cloud is the same, thus whether to remove repeated points is determined based on a parameter. A process of quantization and removal of repeated points is also called a voxelization process. Next, octree partitioning is performed on the bounding box. In an octree-based geometry information encoding process, the bounding box is partitioned into eight equal sub-cubes, and the non-empty sub-cube(s) (containing point(s) in the point cloud) are partitioned into eight equal portions, partitioning is stopped until leaf nodes obtained through partitioning are unit cubes of 1×1×1, then points in the leaf nodes are arithmetically encoded to generate a binary geometric bitstream, i.e., geometric bitstreams In a triangle soup (trisoup)-based geometry information encoding process, octree partitioning is also performed first. However, different from the octree-based geometry information encoding process, in the tri-soup-based geometry information encoding process, the point cloud does not need to be partitioned step by step into unit cubes of 1×1×1, but partitioning is stopped until the point cloud is partitioned into blocks (sub-blocks) with a side length of W. Based on a surface formed by distribution of the point cloud in each block, at most twelve vertexes generated by the surface and twelve edges of the block are obtained, and the vertexes are arithmetically encoded (surface fitting is performed based on the vertexes) to generate a binary geometric bitstream, i.e., geometric bitstream. Vertexes are also used for achieving a process of geometry reconstruction, and reconstructed set information is used when attribute encoding of the point cloud is performed.

After the geometry encoding is completed, the geometric information is reconstructed. At present, the attribute encoding is mainly performed on the color information. In a process of attribute encoding, the color information (i.e., attribute information) is first converted from a Red-Green-Blue (RGB) color space to a Luma-Chroma (YUV) color space. Then, reconstructed geometric information is used for recoloring the point cloud, so that attribute information that is not encoded corresponds to the reconstructed geometric information. In a process of encoding the colour information, there are mainly two transform modes. One mode is a distance-based lifting transform which depends on Level of Detail (LOD) partitioning. At present, LOD partitioning is mainly classified into two ways: LOD partitioning based on distance (mainly for Category1 sequence) and LOD partitioning based on fixed sampling rate (mainly for Category3 sequence). The other mode is a Region Adaptive Hierarchal Transform (RAHT) which is directly performed. In any one of the two modes, the colour information will be converted from a spatial domain to a frequency domain, high-frequency and low-frequency coefficients are obtained through transform, and finally the coefficients are quantized (i.e., quantized coefficients). Finally, after slice synthesis is performed on geometry encoding data, which is processed through octree partitioning and surface fitting, and attribute encoding data which is processed through the quantized coefficients, vertex coordinates of each block are encoded in turn (i.e., arithmetic encoding) to generate a binary attribute bitstream, i.e., attribute bitstream.

Figure 2:
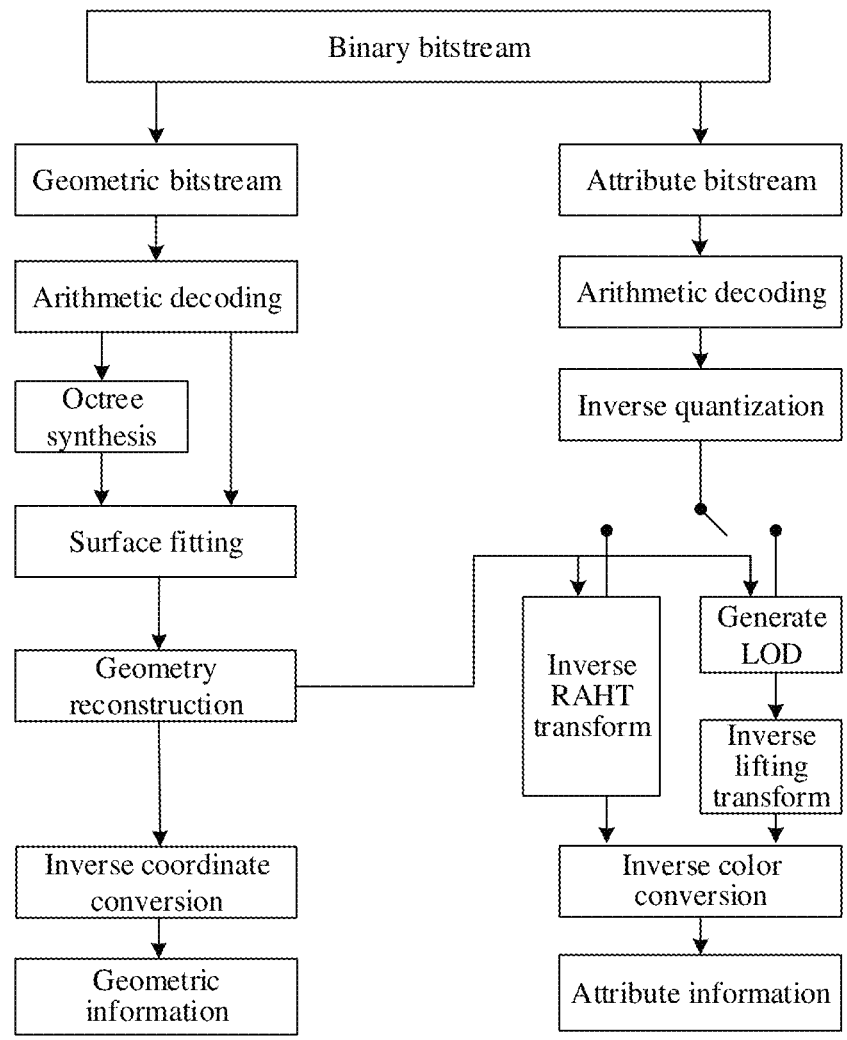
FIG. 2 is a flow block diagram of G-PCC decoding according to a related technical solution.

Referring to FIG. 2, FIG. 2 shows a flow block diagram of G-PCC decoding according to a related technical solution. In the flow block diagram of the G-PCC decoding as shown in FIG. 2, which is applied to a point cloud decoder, for obtained binary bitstream, geometric bitstream and attribute bitstream in the obtained binary bitstream are first decoded independently. When the geometric bitstream is decoded, geometry information of point cloud is obtained through arithmetic decoding-octree synthesis-surface fitting-geometry reconstruction-inverse coordinate transform. When the attribute bitstream is decoded, attribute information of the point cloud is obtained through arithmetic decoding-inverse quantization-LOD-based inverse lifting transform or RAHT-based inverse transform-inverse color conversion. A three-dimensional picture model of point cloud data to be encoded is restored based on the geometry information and the attribute information.

In the flow block diagram of the G-PCC encoding shown in FIG. 1, LOD partitioning is mainly used for predicting and lifting in point cloud attribute transform. LOD partitioning based on distance will be described in detail below.

Specifically, LOD partitioning is to partition an input point cloud into different detail levels (represented by $R_l$, l=0,1, . . . , N−1) through a group of distance thresholds (represented by $d_l$, l=0,1, . . . , N−1), that is, to partition points in the point cloud into different sets $R_1$. The distance thresholds may be self-defined values. The distance threshold $d_l$ needs to meet two conditions: $d_l < d_{l-1}$ and $d_{l-1} = 0$.

A process of LOD partitioning is performed after geometry reconstruction of the point cloud, at this time geometric coordinate information of the point cloud may be obtained directly.

The process of LOD partitioning may be applied to a point cloud encoder and a point cloud decoder at the same time. A specific process is as follows.

(1) All points in the point cloud are placed in an "unvisited" point set, and a "visited" point set (represented by V) is initialized as an empty set.

(2) LOD layers are partitioned through continuous iterations, and a process of generating a detail level $R_l$ corresponding to the lth iteration is shown as follows.

a. All points in the point cloud are traversed through iterations.

b. If a current point has been traversed, this point is ignored.

c. Otherwise, a distance from this point to each point in the set V is calculated respectively, and a nearest distance is recorded as D.

d. If the distance D is greater than or equal to the threshold $d_l$, this point is added to the detail level $R_l$ and the set V.

e. The acts from a to d are repeated until all points in the point cloud have been traversed.

(3) For the lth LOD set, that is, LODl is obtained by combining points in the detail levels $R_0, R_1, \ldots, R_l$.

(4) The acts from (1) to (3) are repeated for continuous iterations until all LOD layers are generated or all points have been traversed.

Figure 3A:
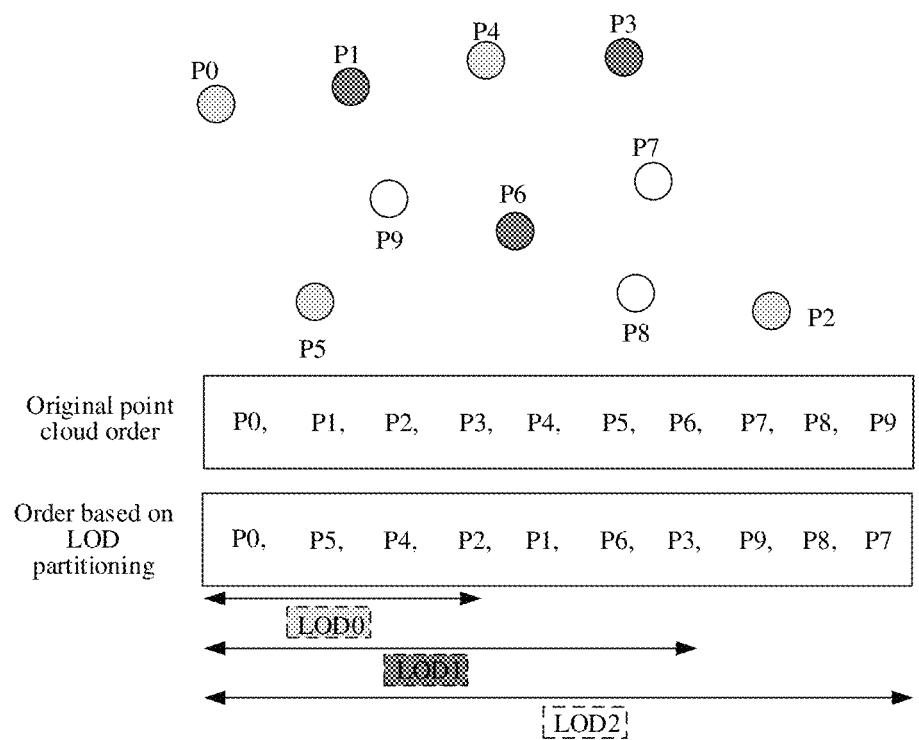
FIG. 3A is a schematic structural diagram of a LOD generation process according to a related technical solution.
Figure 10:
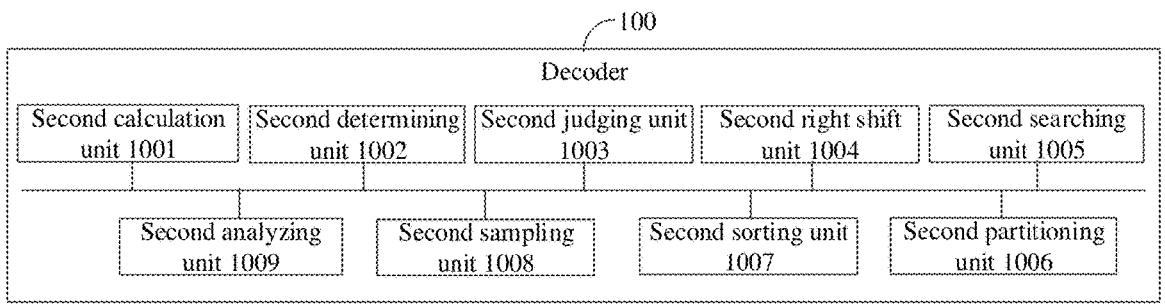
FIG. 10 is a schematic diagram of a structure of a decoder according to an embodiment of the present application.

Referring to FIG. 3A, FIG. 3A shows a schematic structural diagram of a LOD generation process according to a related technical solution. In FIG. 3A, 10 points, such as P0, P1, P2, P3, P4, P5, P6, P7, P8, and P9, are included in a point cloud, and LOD partitioning is performed based on distance threshold. Thus, P0, P5, P4, and P2 are included sequentially in a set LOD0, P0, P5, P4, P2, P1, P6 and P3 are included sequentially in a set LOD1, and P0, P5, P4, P2, P1, P6, P3, P9, P8 and P7 are included sequentially in a set LOD2.

In related technical solutions, a solution for LOD partitioning based on Morton code is proposed. Compared with an original solution of LOD partitioning by traversal search for all points, the solution of LOD partitioning based on Morton code may reduce computational complexity.

Specifically, Morton code is also called z-order code, because its encoding order follows a spatial z-order. Firstly, a variable $P_i$ represents a point in an input point cloud, and a variable $M_i$ is a Morton code related to $P_i$, wherein i=1, 2, . . . , N. A specific process of calculating Morton codes is shown as follows. Each component of a three-dimensional coordinate is represented by a d-bit binary numbers, three coordinate components of the three-dimensional coordinate are represented as follows.

$$x = \sum_{l=1}^{d} 2^{d-l} x_l, y = \sum_{l=1}^{d} 2^{d-l} y_l, z = \sum_{l=1}^{d} 2^{d-l} z_l.$$

Herein $x_l, y_l, z_l \in \{0,1\}$ are binary values corresponding to the most significant digits (l=1) to the least significant digits (l=d) of x, y, and z respectively. For x, y, z, the Morton code M is obtained by sequentially interleaving $x_l, y_l, z_l$ starting from the most significant digit to the least significant digit. A calculation formula of M is as follows.

$$M = \sum_{l=1}^{d} 2^{3(d-l)}(4x_l + 2y_l + z_l) = \sum_{l'=1}^{3d} 2^{3d-l'} m_{l'} \quad (1)$$

Herein $m_{l'} \in \{0,1\}$ is a value based on 1 from the most significant digit l'=1 to the least significant digit (l'=3d) of M. After the Morton code M of each point in the point cloud is obtained, the points in the point cloud are arranged in an order of Morton codes from small to large.

Further, D0 (an initial distance threshold) and ρ (a distance threshold ratio when adjacent LOD layers are partitioned) are user-defined initial parameters respectively, and ρ>1. Assuming that I represents indexes of all points, and during the kth iteration, for points in a LODk layer, the nearest neighbors, that is, the nearest points, will be searched for from a LOD0 layer to a LOD(k−1) layer; k=1, 2, . . . , N−1. Here, N is the total number of the partitioned LOD layers; and when k=0, during the 0th iteration, for points in the LOD0 layer, the nearest neighbors will be searched for directly in the LOD0 layer. A specific process is as follows.

(1) A partitioning distance threshold is initialized as D=D₀.

(2) During the kth iteration, points belonging to the kth LOD layer are saved in set L(k), and a point set with a higher detail level than that of the LODk layer are saved in set O(k). A process of calculating L(k) and O(k) is as follows.

Firstly, O(k) and L(k) are both initialized as empty sets.

Secondly, traversal is performed in an order of indexes of saved points in set I for each iteration. Specifically, geometric distances from a current point to all points in a range in the set O(k) will be calculated for each traversal, and an index of a first point that is greater than a Morton code corresponding to the current point is searched for in the set O(k) based on the Morton code corresponding to the current point in I, and then searching is performed in a search range SR1 of the index (here, SR1 represents a search range based on a Morton code, and its value is generally 8, 16, and 64).

If a point to which a distance from the current point is less than a threshold $d_1$ is found in this range, the current point is added to the set L(k); otherwise, the current point is added to the set O(k).

(3) During each iteration, the sets L(k) and O(k) are calculated respectively, and points in the O(k) will be used for predicting points in the set L(k). Assuming that a set R(k) is equal to L(k)\L(k−1), that is, R(k) represents a point set of a difference value between LOD(k−1) and LOD(k) sets. For points in the set R(k), the nearest h predicted neighbors (generally speaking, h may be set to 3) will be searched for in the set O(k). A specific process of searching for the nearest neighbors is as follows.

a. A Morton code corresponding to a point $P_i$ in the set R(k) is $M_i$.

b. An index j of a first point greater than the Morton code $M_i$ corresponding to the current point $P_i$ is searched for in the set O(k).

c. The nearest neighbors of the current point $P_i$ are searched for in a search range [j−SR2, j+SR2] in the set O(k) based on the index j (here, SR2 represents a search range, and its value is generally 8, 16, 32, and 64).

(4) Iterations are performed continuously by repeating the acts from (1) to (3) until all the points in set I are traversed.

Figure 3B:
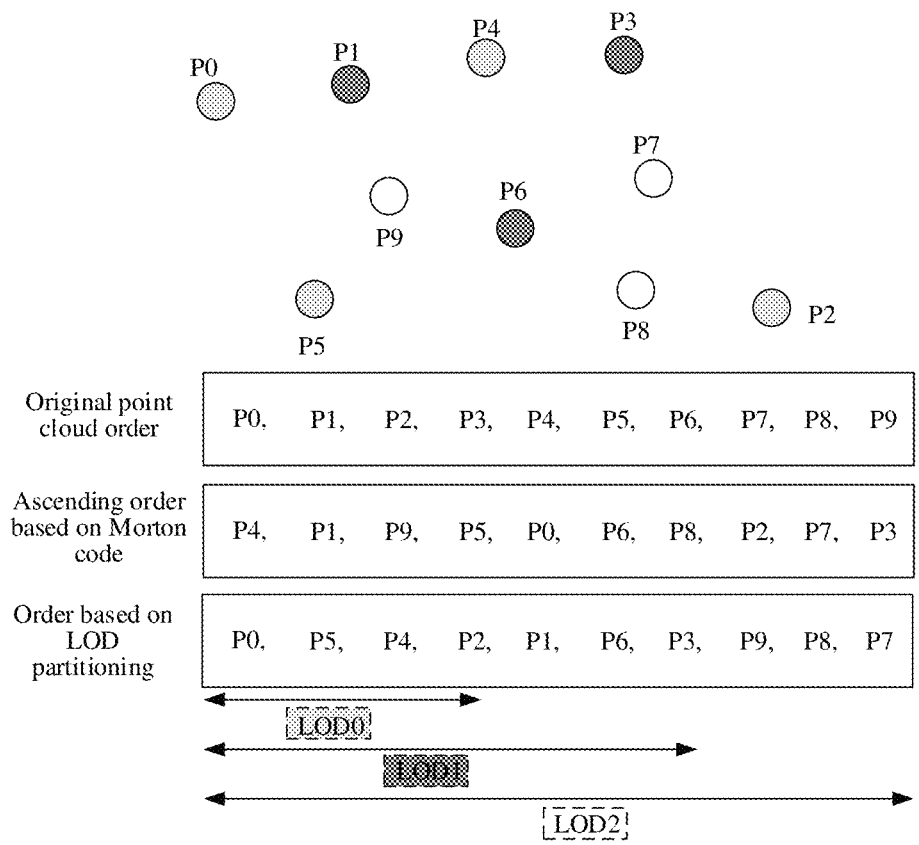
FIG. 3B is a schematic structural diagram of another LOD generation process according to a related technical solution.

Referring to FIG. 3B, which shows a schematic structural diagram of another LOD generation process according to a related technical solution. In FIG. 3B, 10 points, that is, P0, P1, P2, P3, P4, P5, P6, P7, P8, and P9, are included in a point cloud, and LOD partitioning is performed based on Morton code. These 10 points are arranged first in an ascending order of the Morton codes, and an order of the 10 points is P4, P1, P9, P5, P0, P6, P8, P2, P7, and P3. Then, the nearest neighbors are searched for. Thus, P0, P5, P4, and P2 are still included sequentially in a set LOD0, P0, P5, P4, P2, P1, P6, and P3 are still included sequentially in a set LOD1, and P0, P5, P4, P2, P1, P6, P3, P9, P8, and P7 are still included sequentially in a set LOD2.

However, the current solution first performs LOD partition based on different distance thresholds before point cloud attribute transform, predicting and lifting. Specifically, the existing LOD partition calculates the distances between all points every time. When the distance between the point and all the points is less than a distance threshold, the point may be added to the current LOD layer, otherwise, the point may be put to the next layer for LOD partition, and iteration may be carried out continuously according to different threshold ranges until all the points are traversed or all the LOD layers are partitioned, resulting in high computational complexity. In addition, since different point clouds have different spatial distributions, the densities of objects of different point clouds are therefore different. When LOD partition is performed based on distance threshold without considering the spatial distribution characteristics of the point cloud, the neighbor nodes obtained by searching are not accurate enough, which eventually leads to a larger prediction residual based on neighbor nodes prediction. Therefore, the attribute information still have larger redundancy, the number of encoded bits are increased, thus failing to guarantee the best encoding and decoding efficiency.

An embodiment of the present application provides a partitioning method that can be applied to an encoder (also referred to as a point cloud encoder) or a decoder (also referred to as a point cloud decoder). A Morton code of a point of the point cloud to be partitioned is calculated according to a point cloud to be partitioned; a right shift number $N_i$ corresponding to an ith Level of Detail (LOD) layer in the point cloud to be partitioned is determined, where i is an integer greater than or equal to 0, and $N_i$ is an integer greater than 0; whether i is less than or equal to M−1 is determined, where M represents a preset quantity of layers of LOD partitioning; when i is less than or equal to M−1, for the ith LOD layer, right shift of the Morton code of the point of the point cloud to be partitioned is performed by $N_i$ binary digits, and the right-shifted Morton code is stored in a preset storage area; a Morton code of a parent node corresponding to a current node in the ith LOD layer is determined; according to the determined Morton code of the parent node, a preset storage area is searched for the neighbor node corresponding to the parent node; the current node is partitioned into the ith LOD layer, and the neighbor node is partitioned into an (i+1)th LOD layer; i is updated according to i+1, and it is returned to determining of whether i is less than or equal to M−1; and when i is greater than M−1, an 0th LOD layer to an (M−1)th LOD layer are determined as corresponding partitioned LOD layers of the point cloud to be partitioned. Thus, the technical solution of the present application no longer calculates the spatial distance between the current node and the neighbor node, but uses Morton codes to search for the neighbor nodes corresponding to the parent node of the current node every time the LOD layer is partitioned. In addition, the current node is used as a sample to predict the neighbor node, which reduces the computational complexity. Moreover, since the spatial distribution characteristics of the point cloud are considered, the accuracy of the neighbor node's prediction attribute and the reconstruction quality of the attribute part are also improved, which can effectively reduce the encoding bit overheads and further increase the encoding and decoding efficiency.

Various embodiments of the present application will be described in detail below with reference to the accompanying drawings.

Figure 4:
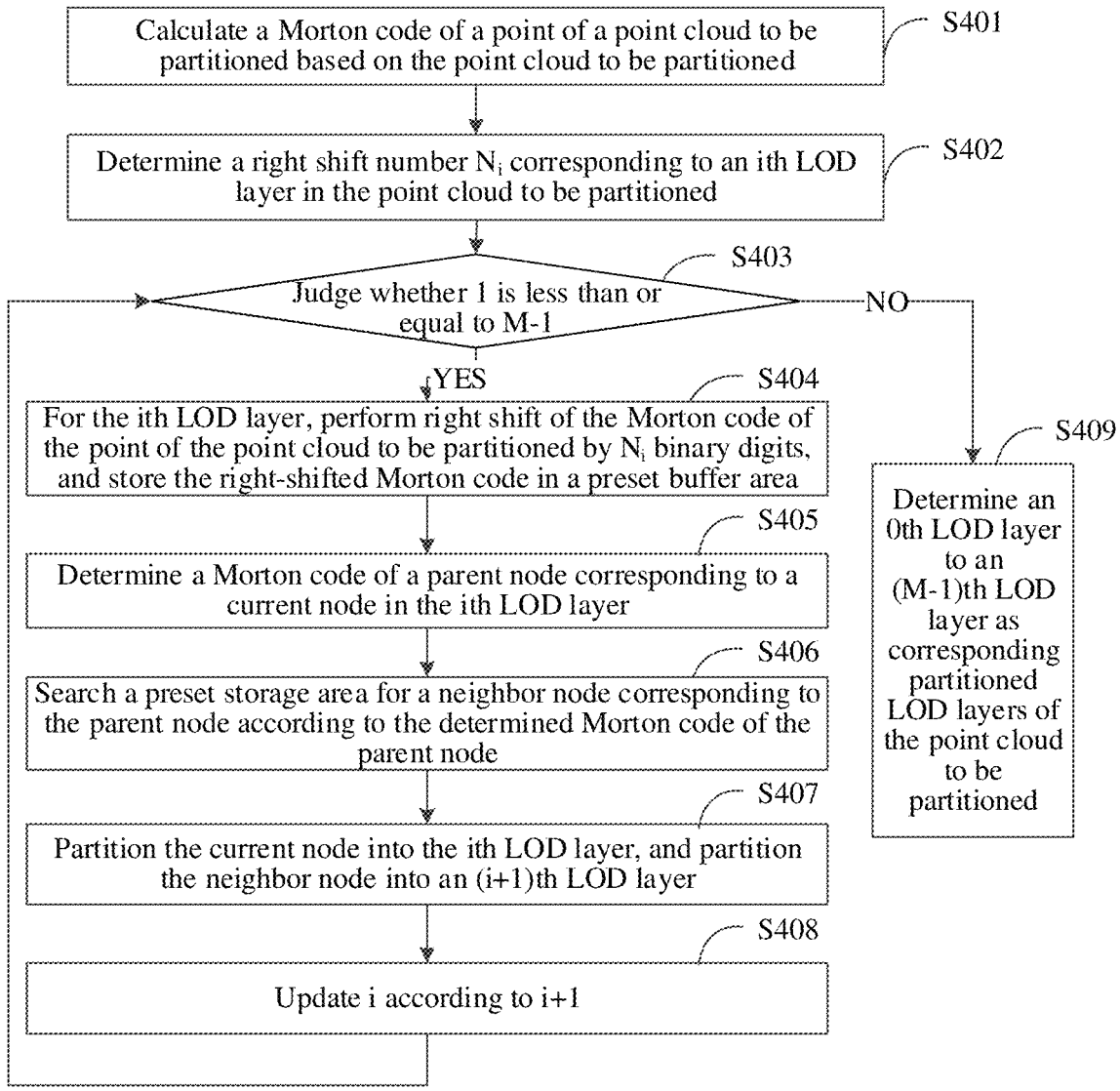
FIG. 4 is a schematic flowchart of a partitioning method according to an embodiment of the present application.

Referring to FIG. 4, which is a schematic flowchart of a partitioning method according to an embodiment of the present application. As shown in FIG. 4, the partitioning method is applied to an encoder or decoder, and the method may include the following acts S401-S409

In S401, a Morton code of a point of the point cloud to be partitioned is calculated according to a point cloud to be partitioned.

It should be noted that the point in the point cloud may be all points in the point cloud, or a portion of points in the point cloud, and these points are relatively concentrated spatially.

It should also be noted that the partitioning method provided by the embodiment of the application is to improve the generation process of LOD in the attribute transform, predicting and lifting. That is to say, before lifting or predicting transform is performed, it needs to use this partitioning method to perform partitioning of the LOD layers. In particular, the partitioning method can be applied to the LOD generation part in the G-PCC encoding flow block diagram shown in FIG. 1, or the LOD generation part in the G-PCC decoding flow block diagram shown in FIG. 2, or may be applied to the LOD generation part in the G-PCC encoding flow block diagram shown in FIG. 1 and the LOD generation part in the G-PCC decoding flow diagram shown in FIG. 2 at the same time, and the embodiments of the present application are not specifically limited.

In this way, after the point cloud to be partitioned is obtained, a Morton code of the point of the point cloud to be partitioned is calculated first, so that in the subsequent iterative operation, the neighbor node corresponding to a parent node of the current node may be searched for by using the Morton code, which is beneficial to the prediction of the neighbor node by using the current node as a sample when the LOD layer partitioning is performed.

In S402, a right shift number $N_i$ corresponding to an ith Level of Detail (LOD) layer in the point cloud to be partitioned is determined.

It should be noted that, i is an integer greater than or equal to 0, and $N_i$ is an integer greater than 0. In order to partition the point cloud to be partitioned into multiple LOD layers, an iterative approach is used here. Herein, the number of layers for LOD partition of the point cloud to be partitioned may be preset. Generally speaking, the preset quantity of layers for LOD partitioning may be represented by M, where M is an integer greater than 0.

In this way, after Morton codes of points of the point cloud to be partitioned are determined, the Morton codes of the points of the point cloud to be partitioned may also be sorted to determine a right shift number corresponding to each LOD layer. Therefore, in some embodiments, the method may further include: the Morton codes of the points of the point cloud to be partitioned are sorted according to a preset sorting strategy, and the sorted Morton codes re determined as the Morton codes of the points of the point cloud to be partitioned.

It should be noted that the preset sorting strategy may be an ascending strategy from small to large, or a descending strategy from large to small, or another sorting strategy (such as a random sorting strategy, etc.). Preferably, the preset sorting strategy is the ascending strategy. That is to say, the Morton codes of the points of the point cloud to be partitioned are sorted in the ascending order from small to large, and the sorted Morton codes are determined as the Morton codes of the points of the point cloud to be partitioned.

In this way, after the Morton codes are sorted, an initial right shift number of the Morton codes of the points of the point cloud to be partitioned may be determined according to the sorted Morton codes. Herein, the initial right shift number represents a right shift number corresponding to Morton codes of points in the 0th LOD layer in the point cloud to be partitioned (which may be represented by No). Specifically, in some embodiments, when i is equal to 0, for S402, the determining the right shift number $N_i$ corresponding to the ith LOD layer in the point cloud to be partitioned may include: the sorted Morton codes are sampled to obtain Morton codes with K samples, where K is an integer greater than 0; the Morton codes of the K samples are shifted right to obtain corresponding K samples after the right-shifted Morton codes; it is to determine whether the K samples corresponding to the right-shifted Morton codes have an average of at least one neighbor node corresponding to each sample; if the K samples corresponding to the right-shifted Morton codes do not have an average of at least one neighbor node corresponding to each sample, the act of performing right shift of the Morton codes of the K samples continues to be performed; if the K samples corresponding to the right-shifted Morton codes have an average of at least one neighbor node corresponding to each sample, the right shift number of the K samples is acquired, and the right shift number is determined as an initial right shift number of the Morton codes of the points in the point cloud to be partitioned; wherein, the initial right shift number represents the right shift number NO corresponding to Morton codes of points in the 0th LOD layer in the point cloud to be partitioned.

Figure 5:
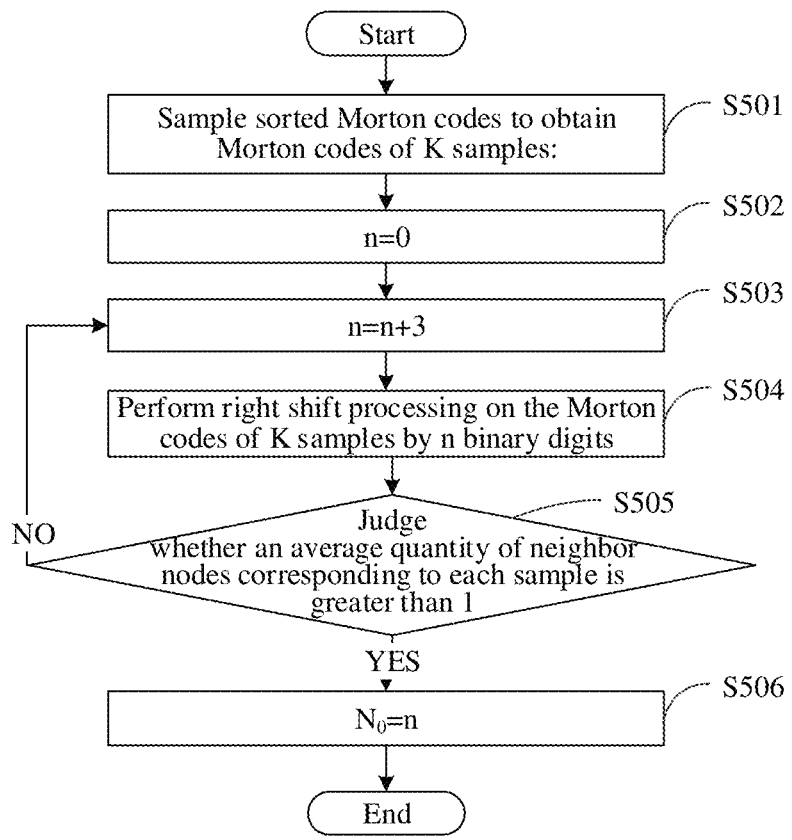
FIG. 5 is a schematic flowchart of determining an initial right shift number according to an embodiment of the present application.

That is to say, when the LOD layer is partitioned initially, that is, an 0th LOD layer is partitioned, firstly, Morton codes of K samples are acquired by sampling the sorted Morton codes. Then, the Morton codes of the K samples are continuously shifted to the right until the K samples corresponding to the Morton codes have an average of at least one neighbor node corresponding to each sample, and finally the obtained right shift number is taken as an initial right shift number No. Specifically, the acquisition process for the initial right shift number No, as shown in FIG. 5, may include the following acts S501-S506.

In S501, the sorted Morton codes are sampled to obtain Morton codes with K samples.

In S502, n=0.

In S503, n=n+3.

In S504, right shift of the Morton codes of K samples is performed by n binary digits.

In S505, it is to judge whether an average number of neighbor nodes corresponding to each sample is greater than 1.

In S506, $N_0=N$.

It should be noted that n is a preset variable, and an initial value of n is set to 0, and then the value of n is updated by n+3 every time, so that the subsequent act S504 is performed, that is, right shift of the Morton codes of K samples is performed by n binary digits.

In addition, for act S505, if the judgment result is YES, act S506 is performed, that is, the initial right shift number $N_0$ may be obtained; if the judgment result is NO, then the act S503 needs to be returned until the judgment result of act S505 is YES to finally obtain the initial right shift number $N_0$.

It should also be noted that K is an integer greater than 0, for example, the value of K may be set to 100, but the embodiments of the present application are not specifically limited. That is to say, in the process of determining the initial right shift number $N_0$, the value of K is often randomly set. However, the way of determining the value of K may also include: analyzing characteristics of the point cloud to be partitioned to determine the value of K.

Here, the value of K is usually related to the characteristic information of the point cloud to be partitioned, such as the number and spatial density of points in the point cloud to be partitioned. In this way, the characteristic analysis of the point cloud to be partitioned may be carried out to determine the value of K, and then the initial right shift number $N_0$ can be determined. Since the value of K is obtained by combining the characteristics of the entire point cloud to be partitioned, the encoding and decoding efficiency can therefore be improved.

It can be understood that after the Morton codes are sorted, the initial right shift number $N_0$ can also be determined by continuously right shift processing based on the difference value between the maximum Morton code and the minimum Morton code. Specifically, in some embodiments, when i is equal to 0, for S402, the determining the right shift number $N_i$ corresponding to the ith LOD layer in the point cloud to be partitioned may include: a maximum Morton code and a minimum Morton code are determined according to the sorted Morton code; a difference value between the maximum Morton code and the minimum Morton code is calculated; right shift of the difference value is performed, and a right shift number of the difference value is acquired when the right-shifted difference value meets a preset range; and the right shift number is determined as an initial right shift number of the point cloud to be partitioned.

It should be noted that since Morton codes are sorted in an ascending order from small to large, the maximum Morton code and the minimum Morton code can be determined according to the sorted Morton codes, and then the difference value between the maximum Morton code and the minimum Morton code can be calculated (which may be represented by delta).

By shifting delta binary digits to right, a shifted delta may be obtained after the delta binary digits are shifted to right by N binary digits, such that the shifted delta may meet a preset range, in this case N can be determined as the initial right shift number $N_0$. Shifting the delta binary digits to right by N binary digits may be regarded as shifting the maximum value binary digits of the Morton codes to right by N binary digits and shifting the minimum value binary digits of the Morton codes to right by N binary digits, then a difference value between the shifted maximum value binary digits and the shifted minimum value bit is calculated, and the obtained difference value means the value obtained by shifting the delta binary digits to right by N binary digits.

It should further be noted that the preset range indicates whether the average number of neighbor nodes corresponding to each sample is greater than 1. In this way, when the difference value on which right shift is performed by N binary digits meets the preset range, the right shift number N at this time can be determined as the initial right shift number $N_0$, thereby improving the encoding and decoding efficiency.

Further, after the initial right shift number $N_0$ is determined, that is, the right shift number corresponding to the 0th LOD layer in the point cloud to be partitioned is determined, a right shift number $N_i$ corresponding to the ith LOD layer in the point cloud to be partitioned may also be determined according to the initial right shift number $N_0$, where i is not equal to 0. Specifically, in some embodiments, when i is equal to 0, for S402, the determining the right shift number $N_i$ corresponding to the ith LOD layer in the point cloud to be partitioned may include: the right shift number $N_i$ corresponding to the ith LOD layer in the point cloud to be partitioned is determined by using a first preset calculation model.

Further, in some embodiments, the determining the right shift number $N_i$ corresponding to the ith LOD layer in the point cloud to be partitioned by using a first preset calculation model may include: a right shift number $N_{i-1}$ corresponding to an (i−1)th LOD layer is acquired; the right shift number $N_{i-1}$ corresponding to the (i−1)th LOD layer is superimposed with a preset value to obtain a superimposed value; and the superimposed value is determined as the right shift number $N_i$ of the ith LOD layer.

That is to say, when LOD layers later are partitioned, the right shift number corresponding to the ith LOD layer is determined according to the right shift number corresponding to the previous LOD layer (i.e., the (i−1)th LOD layer). The first preset calculation model is as follows, $$N_i = N_{i-1} + m \qquad (2)$$

Here, $N_i$ represents the right shift number of the current LOD layer, that is, the right shift number corresponding to the ith LOD layer; $N_{i-1}$ indicates the right shift number of the previous LOD layer, that is, the right shift number corresponding to the (i−1)th LOD layer; and m is a preset value.

It should be noted that the preset value may be set according to an actual point cloud space situation. Preferably, the preset value may be equal to 3, but embodiments of the present application are not limited.

Further, in some embodiments, the method may further include: characteristic analysis of the point cloud to be partitioned is performed to determine the preset value.

Here, the preset value is usually related to the characteristic information of the point cloud to be partitioned, such as the number and spatial density of points in the point cloud to be partitioned. In this way, the characteristic analysis of the point cloud to be partitioned may be carried out to determine the preset value. Herein, the preset value corresponding to each LOD layer may be same or different. For example, based on the characteristics of the point cloud to be partitioned, the preset values corresponding to different LOD layers when the right shift numbers are calculated can be adaptively adjusted, so that the adjacent areas corresponding to different areas can be searched for more accurately, and the prediction performance can be further improved.

Thus, after the right shift number corresponding to each LOD layer is determined, the right shift processing can be performed according to the right shift number corresponding to each LOD layer to perform the partitioning of each LOD layer.

In S403, whether i is less than or equal to M−1 is determined.

It should be noted that M represents the preset quantity of layers of LOD partitioning, where M is an integer greater than 0. When i is less than or equal to M−1, each LOD layer needs to be partitioned in this case, that is, acts S404-S408 are performed; when i is greater than M−1, each LOD partitioning has been completed in this case, that is, act S409 is performed.

In S404, when i is less than or equal to M−1, for the ith LOD layer, right shift of the Morton code of the point of the point cloud to be partitioned is performed by $N_i$ binary digits, and the right-shifted Morton code is stored in a preset storage area.

In S405, a Morton code of a parent node corresponding to a current node in the ith LOD layer is determined.

In S406, according to the determined Morton code of the parent node, a preset storage area is searched for a neighbor node corresponding to the parent node.

In S407, the current node is partitioned into the ith LOD layer, and the neighbor node is partitioned into an (i+1)th LOD layer.

It should be noted that the preset storage area may be represented by inputMorton. Before each LOD layer is partitioned, right shift of the Morton code of the point of the point cloud to be partitioned is performed, and then the right-shifted Morton code is stored in inputMorton, so as to facilitate the subsequent query of a corresponding neighbor node through the Morton code.

It should also be noted that before querying the corresponding neighbor node through the Morton code, it needs to first determine the Morton code of the parent node corresponding to the current node in the ith LOD layer. Specifically, in some embodiments, for S405, the determining the Morton code of the parent node corresponding to the current node in the ith LOD layer may include: based on the right shift number $N_i$ corresponding to the ith LOD layer, right shift of the Morton code of the current node in the ith LOD layer is performed; and the right-shifted Morton code is determined as the Morton code of the parent node corresponding to the current node in the ith LOD layer.

Here, the Morton code of the current node is represented by childrenMorton and the Morton code of the parent node is represented by parentMorton, and the correspondence between the two Morton codes is as follows.

$$parentMorton = childrenMorton \gg N_i \qquad (3)$$

That is, based on the right shift number $N_i$ corresponding to the ith LOD layer, the Morton code (represented by childrenMorton) of the current node in the ith LOD layer may be shifted to the right by $N_i$ binary digits, and then the right-shifted Morton code is determined as the Morton code (represented by parentMorton) of the parent node corresponding to the current node in the ith LOD layer.

Further, after the Morton code of the parent node corresponding to the current node is determined, a neighbor node corresponding to the parent node may be searched for according to the Morton code of the parent node. Specifically, in some embodiments, for S406, the searching the preset storage area for the neighbor node corresponding to the parent node according to the determined Morton code of the parent node may include: according to the determined Morton code of the parent node, a Morton code of the neighbor node corresponding to the parent node is determined; and according to the Morton code of the neighbor node, the preset storage area is searched for neighbor node corresponding to the Morton code of the neighbor node.

In addition, the determining the Morton code of the neighbor node corresponding to the parent node according to the determined Morton code of the parent node may include: according to the determined Morton codes of the parent node, Morton codes of all neighbor nodes coplanar, collinear and co-point with the parent node are calculated, to obtain Morton codes of a first quantity of neighbor nodes; the Morton codes of the first quantity of neighbor nodes are respectively compared with the Morton code of the current node; when the Morton code of the neighbor node is smaller than the Morton code of the current node, the Morton code of the neighbor node is discarded; when the Morton code of the neighbor node is greater than or equal to the Morton code of the current node, the Morton code of the neighbor node is reserved to obtain Morton codes of a second quantity of the neighbor nodes; wherein, the second quantity is less than or equal to the first quantity; and the Morton codes of the second quantity of neighbor nodes are determined as the Morton codes of the neighbor nodes corresponding to the parent node.

It should be noted that after the Morton code of the parent node is determined, the Morton codes coplanar (6 neighbor nodes in total), collinear (12 neighbor nodes in total) and co-point (8 neighbor nodes in total) with the parent node may be calculated, and the Morton codes of the first quantity (for example, 27) of neighbor nodes in total may be obtained when the Morton code of the parent node itself is also included. Since the LOD layers are partitioned according to the ascending order of Morton codes, 27 neighbor nodes may be reduced to a second quantity (such as 20) of neighbor nodes in this case. Specifically, the Morton codes of 27 neighbor nodes are compared with the Morton codes of the current node. If a Morton code of a neighbor node is smaller than the Morton code of the current node, the Morton code of the neighbor node may be discarded. For example, assuming that the Morton codes of seven neighbor nodes are smaller than the Morton code of the current node, then the Morton codes of the seven neighbor nodes are removed. The Morton codes of the remaining 20 neighbor nodes are greater than or equal to the Morton code of the current node, and therefore only the Morton codes of the remaining 20 neighbor nodes are reserved. Here, the remaining 20 neighbor nodes may include the parent node corresponding to the current node, coplanar neighbor nodes (3 neighbor nodes), collinear neighbor nodes (9 neighbor nodes) and co-point neighbor nodes (7 neighbor nodes).

Figure 6:
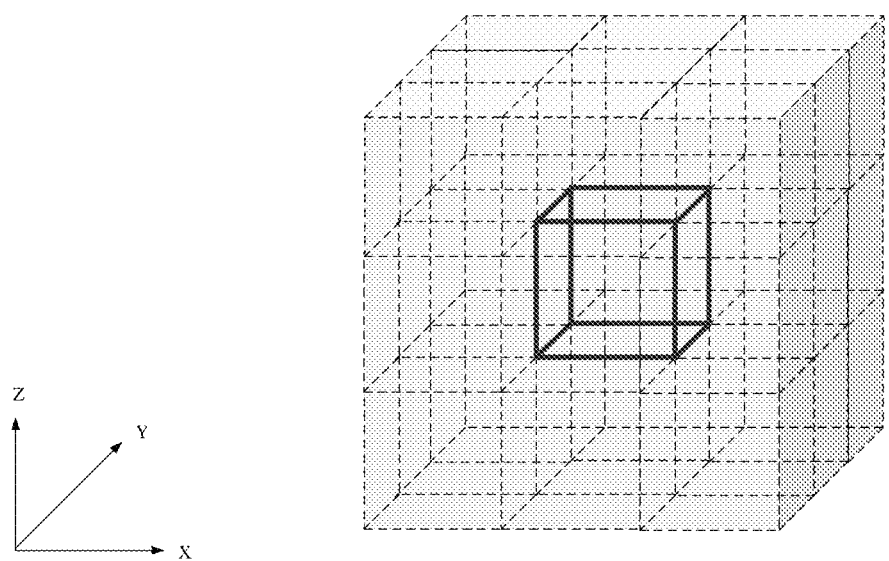
FIG. 6 is a schematic diagram of a spatial relationship between a current node and a neighbor node according to an embodiment of the present application.

Illustratively, referring to FIG. 6, FIG. 6 is a schematic diagram of a spatial relationship between a current node and neighbor nodes according to an embodiment of the present application. In FIG. 6, the bold marked spatial block is the current node. As can be seen from FIG. 6, there are 6 neighbor nodes coplanar with the spatial block, 12 neighbor nodes collinear with the spatial block, and 8 neighbor nodes coplanar with the spatial block. Thus, according to the determined Morton code of the parent node, the Morton codes of the neighbor nodes corresponding to the parent node may be determined, and the Morton codes of the neighbor nodes may be used to search the corresponding neighbor nodes in the preset storage area (inputMorton).

In this way, for the ith LOD layer, after the neighbor nodes are searched out, the current node may be partitioned into the ith LOD layer, that is, put into the set O(k), and the neighbor nodes may be partitioned into the (i+1)th LOD layer, that is, put into the set L(k); wherein, K is an integer greater than or equal to 0; and the partitioning of the ith LOD layer can be achieved.

Furthermore, in order to improve the prediction effect of neighbor nodes, the neighbor nodes may be predicted by calculating the centroid of the adjacent area, and then taking the nearest point to the centroid as the target node. Thus, in some embodiments, after the Morton codes of the first quantity of neighbor nodes are acquired, the method may further include: based on the point cloud to be partitioned, the adjacent area corresponding to the current node in the ith LOD layer is determined; a centroid of the adjacent area is calculated, and a node closest to the centroid is selected as a target node from the current node and the first quantity of neighbor nodes; and the target node is partitioned into the ith LOD layer, and the remaining nodes are partitioned into an (i+1)th LOD layer.

It should be noted that the remaining nodes represent nodes other than the target node among the current node and the first quantity of neighbor nodes. In this way, according to the neighbor nodes of the parent node corresponding to the current node, the adjacent area corresponding to the current node in the ith LOD layer can be determined. Then the centroid of the adjacent area is calculated, and the node closest to the centroid is selected as the target node from the current node and the first quantity of neighbor nodes. In this way, the target node is partitioned into the ith LOD layer, and the remaining nodes are partitioned into the (i+1)th LOD layer, which can also achieve the partitioning of the ith LOD layer.

It should also be noted that, according to the neighbor nodes of the parent node corresponding to the current node, after the adjacent area corresponding to the current node in the ith LOD layer is determined, the adjacent area may also be partitioned into different spatial regions, and the corresponding points are selected from the different spatial regions as target nodes. In this way, the target nodes are partitioned into the ith LOD layer, and the remaining nodes are partitioned into the (i+1)th LOD layer, which can also achieve the partitioning of the ith LOD layer. At the same time, due to the further spatial partition of the adjacent area, the prediction performance can be further improved.

In S408, i is updated according to i+1, and it is returned to determining of whether i is less than or equal to M−1.

In S409, when i is greater than M−1, an 0th LOD layer to an M−1th LOD layer are determined as corresponding partitioned LOD layers of the point cloud to be partitioned.

It should be noted that, after the partition of the ith LOD layer is completed, the value of i may be updated by i=i+1, and then it returns to perform the act S403, that is, to judge whether i is less than or equal to M−1, until the partition of the (M−1)th LOD layer is completed, that is, when i is equal to M, it indicates that the partition of the LOD layers of the point cloud to be partitioned has been completed. At this time, the 0th to the (M−1)th LOD layers may be determined as corresponding partitioned LOD layers of the point cloud to be partitioned.

It should also be noted that after right shift of the Morton codes of the points in the point cloud to be partitioned is performed, different sets may be obtained, that is, the points in the point cloud to be partitioned are clustered, and the points in an adjacent area in the space (that is, the space is relatively concentrated) are partitioned into a same set; then, the LOD layers are partitioned for each set. In particular, in some embodiments, the method may further include: right shift of the Morton codes of the points of the point cloud to be partitioned is performed to obtain multiple sets; wherein, each set includes a part of the point cloud to be partitioned; and for each of the multiple sets, the act of performing LOD layer partitioning on the part of the point cloud to be partitioned included in each set is performed respectively.

That is to say, the point cloud to be partitioned can be partitioned into multiple sets by adjusting the right shift number of Morton codes of points in the point cloud to be partitioned, and each set includes a part of the point cloud to be partitioned, that is, a part of the points. For each set, the partitioning method of the embodiment of the application is also used to search for the neighbor node corresponding to the parent node of the current node based on the Morton code, and the partitioning mode can partition the point cloud in the adjacent area in the space into a same set, thereby further improving the prediction performance.

In the embodiment of the present application, the LOD layers may be partitioned by searching for the neighbor node based on the Morton code. Specifically, the way by which the neighbor node corresponding to the parent node of the current node is searched for by using the Morton code of the current node, i.e., the way of predicting the neighbor node according to the current node as a sample, or the way by which the Morton code of the current node is used to partition the adjacent area in the point cloud space, i.e., in order to partition the spatially near parts in the point cloud space to obtain different sets (or clusters), can improve the effect of attribute prediction based on the neighbor node, thus improving the encoding efficiency.

That is to say, the neighbor node of the parent node corresponding to the current node is searched for based on the Morton code, and the neighbor node is predicted by taking the current node as a sample. In this way, the spatial distribution characteristics of the point cloud and the spatial distances between points of the point cloud may be comprehensively considered, which can improve the effect of attribute prediction based on the neighbor node. That is to say, on the premise of basically not affecting the performance, the reconstruction quality of the attribute part can be improved, and the encoding and decoding time and computational complexity of the attribute prediction can also be reduced, thus improving the encoding efficiency. Herein, Peak Signal to Noise Ratio (PSNR) may be used as an objective standard for image evaluation, and the larger the PSNR, the better the image quality. BD-rate may also be used as a parameter to measure the performance, and when the BD-rate is negative, it indicates that the bit rate decreases and the performance improves under the same PSNR condition. On this basis, the greater the absolute value of the BD-rate, the greater the performance gain. As shown in Table 1, on the premise of basically not affecting the performance, the bit rate of the color channel (represented by U and V) in the attribute part can be reduced, which can obviously improve the BD-rate of the reconstructed point cloud.

TABLE 1

| Point cloud file | Initial right shift number | BD-Attribute | | Time | |
|---|---|---|---|---|---|
| | | U | V | Encoder_time | Decoder_time |
| frog__00067__vox12 | 6 | −7.4% | −16.6% | 95% | 89% |
| facade__00064__vox11 | 6 | 13.3% | −4.5% | 96% | 86% |
| house__without__roof__vox12 | 6 | −3.4% | −3.3% | 88% | 78% |
| Average | 6 | −0.8% | −8.1% | 93% | 84% |

The embodiment of the present application provides a partitioning method. In the partitioning method, a Morton code of a point of a point cloud to be partitioned is calculated according to the point cloud to be partitioned; a right shift number $N_i$ corresponding to an ith Level of Detail (LOD) layer in the point cloud to be partitioned is determined, where i is an integer greater than or equal to 0, and $N_i$ is an integer greater than 0; whether i is less than or equal to M−1 is determined, where M represents a preset quantity of layers of LOD partitioning; when i is less than or equal to M−1, for the ith LOD layer, right shift of the Morton code of the point of the point cloud to be partitioned is performed by $N_i$ binary digits, and the right-shifted Morton code is stored in a preset storage area; a Morton code of a parent node corresponding to a current node in the ith LOD layer is determined; according to the determined Morton code of the parent node, a preset storage area is searched for a neighbor node corresponding to the parent node; the current node is partitioned into the ith LOD layer, and the neighbor node is partitioned into an (i+1)th LOD layer; i is updated according to i+1, and it is returned to the act of judging whether i is less than or equal to M−1; and when i is greater than M−1, an 0th LOD layer to an (M−1)th LOD layer are determined as corresponding partitioned LOD layers of the point cloud to be partitioned. Thus, the technical solution of the present application no longer calculates the spatial distances between the current node and the neighbor nodes, but uses Morton codes to search for the neighbor nodes corresponding to the parent node of the current node every time the LOD layer is partitioned. In addition, the current node is used as a sample to predict the neighbor nodes, which reduces the computational complexity. Moreover, since the spatial distribution characteristics of the point cloud are considered, the accuracy of the neighbor node's prediction attribute and the reconstruction quality of the attribute part are also improved, which can effectively reduce the encoding bit overheads and further increase the encoding and decoding efficiency.

Figure 7:
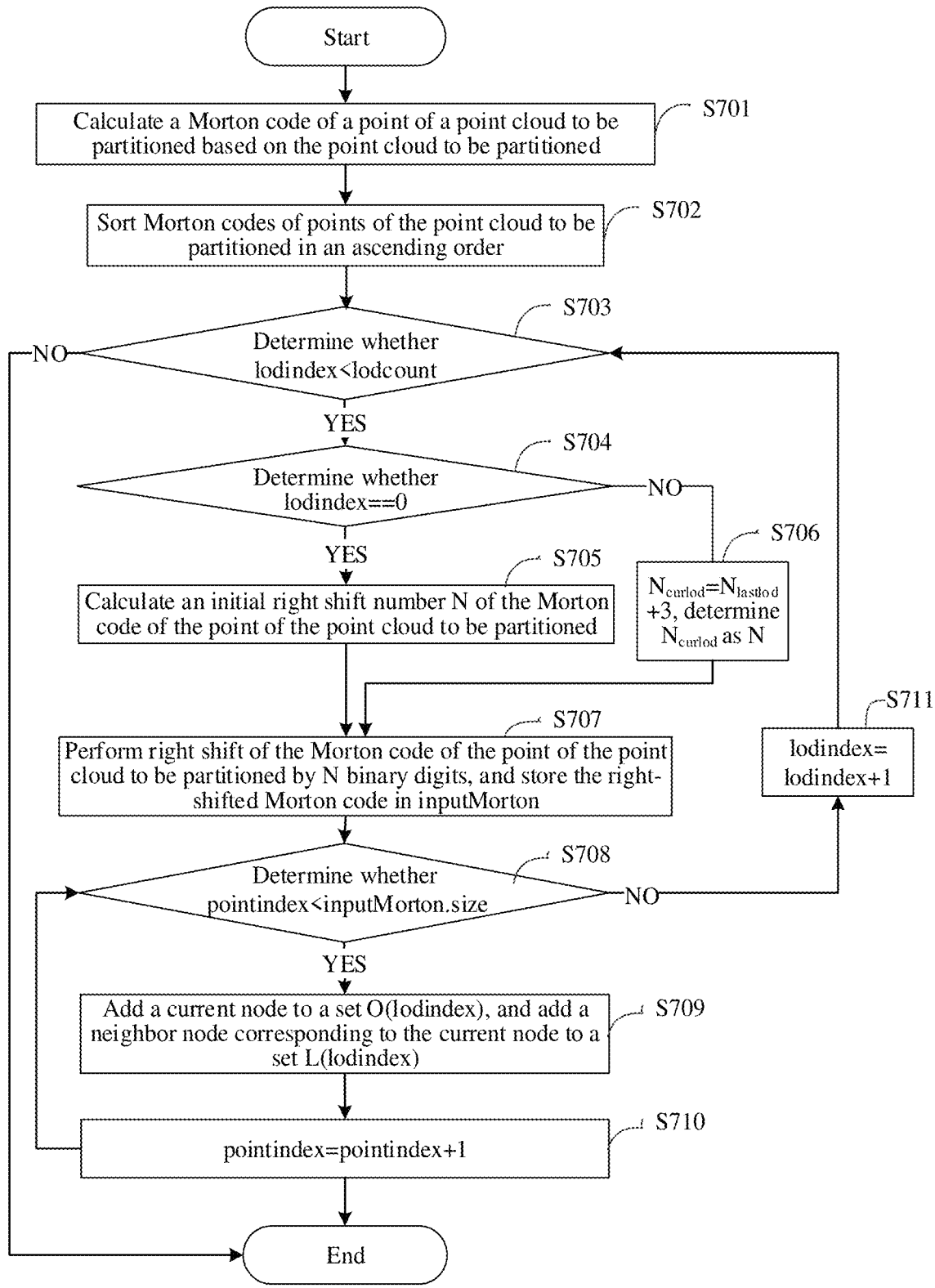
FIG. 7 is a detailed schematic flowchart of a partitioning method according to an embodiment of the present application.

Based on the same inventive concept as the foregoing embodiments, referring to FIG. 7, FIG. 7 is a detailed schematic flowchart of a partitioning method according to an embodiment of the present application. As shown in FIG. 7, the partitioning method is applied to an encoder or decoder, the detailed flow may include the following acts S701-S711.

In S701, a Morton code of a point of a point cloud to be partitioned is calculated based on the point cloud to be partitioned.

In S702, Morton codes of points of the point cloud to be partitioned are sorted in an ascending order.

It should be noted that, for the point cloud to be partitioned, it is assumed that the point cloud to be partitioned contains N points, each point is represented as $P_i$, and the Morton code corresponding to each point $P_i$ is $M_i$, i=0, 1, 2, . . . , N−1. That is to say, the Morton codes corresponding to the points of the point cloud to be partitioned (which may be represented by packVoxel) are first calculated. Then the Morton codes of the points of the point cloud to be partitioned are sorted in an ascending order from small to large, and the sorted Morton codes are determined as the Morton codes of the points in the point cloud to be partitioned.

In S703, whether lodindex<lodcount is determined.

It should be noted that lodindex indicates which LOD layer is currently partitioned, such as the (lodindex)th LOD layer; lodcount indicates the preset total number of partitioned layers of the point cloud to be partitioned. Here, lodcount is an integer greater than 0, and lodindex is an integer greater than or equal to 0 and less than or equal to lodcount−1.

It should also be noted that when lodindex<lodcount, that is, the judgment result is YES, and act S704 may be performed in this case; when lodindex≥lodcount, the judgment result is NO, and the process may be ended in this case.

In S704, if the judgment result is YES, whether lodindex==0 is determined.

In S705, if the judgment result is YES, an initial right shift number N of the Morton code of the point of the point cloud to be partitioned is calculated.

In S706, if the judgment result is NO, then $N_{curlod}=N_{lastlod}+3$, and $N_{curlod}$ is determined as N.

It should be noted that $N_{curlod}$ represents the right shift number corresponding to the currently processed LOD layer, and $N_{lastlod}$ represents the right shift number corresponding to the last processed LOD layer. For example, if the initial right shift number corresponding to the 0th LOD layer is 4, then the right shift number corresponding to the first LOD layer is 7, the right shift number corresponding to the second LOD layer is 10, the right shift number corresponding to the third LOD layer is 13, and so on, the right shift number corresponding to each LOD layer can be obtained.

In this way, when lodindex<lodcount, it needs to further determine whether lodindex is equal to 0. If the lodindex is equal to 0, that is, the judgment result is YES, then the act S705 may be performed, that is, the initial right shift number N of the Morton code of the point of the point cloud to be partitioned is calculated. If lodindex is not equal to 0, that is, the judgment result is NO, then act S706 may be performed, that is, $N_{curlod}=N_{lastlod}+3$, and then $N_{curlod}$ is determined as N, so that act S707 may be performed later.

In S707, right shift of the Morton code of the point of the point cloud to be partitioned is performed by N binary digits, and the right-shifted Morton code is stored in inputMorton.

In S708, whether pointindex<inputMorton.size is determined.

It should be noted that pointindex represents an index of the current node in inputMorton, and inputMorton.size represents a length of inputMorton. In this way, when pointindex<inputMorton.size, that is, the judgment result is YES, which indicates that the current node is still in the (lodindex)th LOD layer, and act S709; needs to be performed in this case. When pointindex≥inputMorton.size, the judgment result is NO, which indicates that the current node is no longer in the (lodindex)th LOD layer, and act S710 needs to be performed in this case.

In S709, if the judgment result is YES, the current node is added to the set O(lodindex), and the neighbor node corresponding to the current node is added to the set L(lodindex).

In S710, pointindex=pointindex+1, and it returns to perform the act S708.

In S711, if the judgment result is NO, then lodindex=lodindex+1, and it returns to perform the act S703.

It should be noted that when pointindex<inputMorton.size, the current node is added to the set O(lodindex), that is, the current node is partitioned into the (lodindex)th LOD layer; at the same time, the neighbor node corresponding to the current node is added into the set L(lodindex), that is, the neighbor node corresponding to the current node is partitioned into the (lodindex+1)th LOD layer; then pointindex=point index+1, and it is returned to act S708 until point index=inputMorton.size−1, thus achieving the partitioning of the (lodindex)th LOD layer. Further, when pointindex≥inputMorton.size, it indicates that the partitioning of the (lodindex)th LOD layer is completed, at this time, lodindex=lodindex+1 is needed, and it is returned to perform act S703 until lodindex=lodcount−1, so as to achieve the partitioning of the (lodcount−1)th LOD layer. Thus, the LOD partitioning of the point cloud to be partitioned is achieved. Here, the 0th LOD layer to the (lodcount−1)th LOD layer are determined as corresponding partitioned LOD layers of the point cloud to be partitioned.

Specifically, the Morton codes of K samples can be obtained by sampling the sorted Morton codes of the point cloud to be partitioned, and the initial right shift number N corresponding to the point cloud to be partitioned can be obtained by performing right shift of the Morton codes of the K samples, and the right shift number corresponding to each LOD layer can be further determined. Then, when each LOD layer is partitioned, right shift of the Morton codes of the points of the input point cloud to be partitioned is performed by N binary digits, and the right-shifted Morton codes are stored in inputMorton. At this time, the Morton code of the parent node corresponding to the current node may be calculated, and the Morton code of its neighbor node may be calculated by the parent node. Finally, the neighbor node corresponding to the Morton code of the neighbor node may be searched for in inputMorton, so that the current node may be partitioned into O(lodindex), and the searched neighbor nodes may be partitioned into L(lodindex).

In the embodiments of the present application, there is no need to calculate the spatial distances between the current point and the neighbor points. Generally speaking, it may be considered that the spatial distances between the neighbor nodes, which are in the same parent node as the current node, coplanar or collinear or co-point with the current node, and the current node is very close, it may be regarded as belonging to the same adjacent area. In this case, the neighbor nodes corresponding to the parent node of the current node may be queried based on Morton codes. Compared with the prior solution of querying neighbor nodes based on different distance thresholds, the partitioning method of the embodiments of the present application does not need to set different threshold parameters, and does not need to calculate the spatial distance between points every time, thereby reducing the calculation complexity to a great extent.

Further, in embodiments of the present application, every time the LOD layer is partitioned, since only the neighbor nodes corresponding to the parent node of the current node need to be determined, the current node is added to the set O(k) and the neighbor nodes corresponding to the current node are added to the set L(k), instead of only considering the spatial geometric distances between points, the spatial distribution characteristics of the point cloud are also taken into account on the basis of spatial distribution. That is, by comprehensively considering the spatial geometric distances of points in space and the spatial distribution characteristics of the point cloud in space, the prediction performance can be improved to obtain better encoding and decoding performance. It should be particularly noted that the partitioning method of the embodiment of the present application only searches for the neighbor nodes of the current node for sampling based on the Morton codes of the original point cloud, and compared with the original partitioning method of searching for the nearest neighbor in a certain range through the indexes of the Morton codes every time, reduces the computational complexity to a great extent.

The embodiment of the present application provides a partitioning method, which is applied to an encoder or a decoder. The specific implementation of the foregoing embodiments is described in detail through the foregoing embodiments, from which it can be seen that, the technical solution of the present application no longer calculates the spatial distances between the current node and the neighbor nodes, but uses Morton codes to search for the neighbor nodes of the parent node corresponding to the current node every time the LOD layer is partitioned. In addition, the current node is used as a sample to predict the neighbor nodes, which reduces the computational complexity. Moreover, since the spatial distribution characteristics of the point cloud are considered, the accuracy of the neighbor node's prediction attribute and the reconstruction quality of the attribute part are also improved, which can effectively reduce the encoding bit overheads and further increase the encoding and decoding efficiency.

Figure 8:
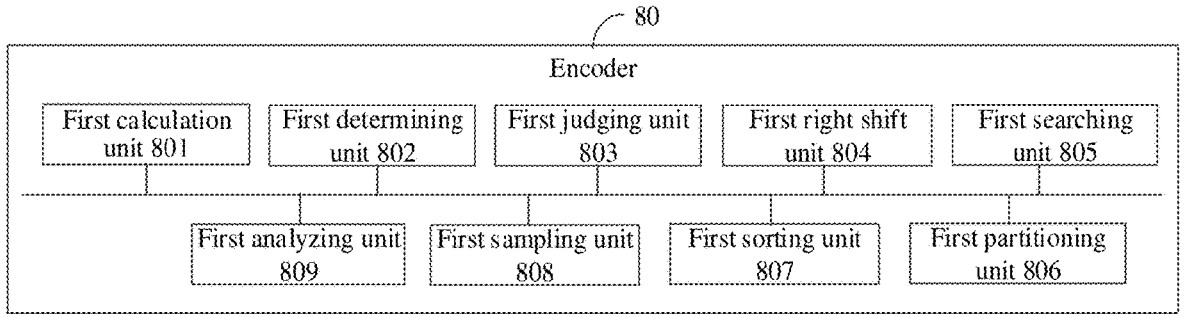
FIG. 8 is a schematic diagram of a structure of an encoder according to an embodiment of the present application.

Based on the same inventive concept as the foregoing embodiments, referring to FIG. 8, FIG. 8 shows a schematic diagram of a structure of an encoder 80 according to an embodiment of the present application. As shown in FIG. 8, the encoder 80 may include a first calculation unit 801, a first determining unit 802, a first judging unit 803, a first right shift unit 804, a first searching unit 805, and a first partitioning unit 806.

The first calculation unit 801 is configured to calculate a Morton code of a point of a point cloud to be partitioned based on the point cloud to be partitioned.

The first determining unit 802 is configured to determine a right shift number $N_i$ corresponding to an ith Level of Detail (LOD) layer in the point cloud to be partitioned, where i is an integer greater than or equal to 0 and $N_i$ is an integer greater than 0.

The first judging unit 803 is configured to judge whether i is less than or equal to M−1, where M represents a preset quantity of layers of LOD partitioning.

The first right shift unit 804 is configured to, for the ith LOD layer, perform right shift of the Morton code of the point of the point cloud to be partitioned by $N_i$ binary digits when i is less than or equal to M−1, and stores the right-shifted Morton code in a preset storage area.

The first determining unit 802 is further configured to determine the Morton code of a parent node corresponding to the current node in the ith LOD layer.

The first searching unit 805 is configured to search a preset storage area for a neighbor node corresponding to the parent node according to the determined Morton code of the parent node.

The first partitioning unit 806 is configured to partition the current node into the ith LOD layer and partition the neighbor node into an (i+1)th LOD layer.

The first partitioning unit 803 is configured to update I according to i+1, and return to judge whether i is smaller than or equal to M−1.

The first determining unit 802 is further configured to determine an 0th LOD layer to an (M−1)th LOD layer as corresponding partitioned LOD layers of the point cloud to be partitioned when i is greater than M−1.

In the above solution, referring to FIG. 8, the encoder 80 may further include a first sorting unit 807 configured to, according to a preset sorting strategy, sort Morton codes of points of the point cloud to be partitioned, and determine the sorted Morton codes as the Morton codes of the points of the point cloud to be partitioned.

In the above solution, referring to FIG. 8, the encoder 80 may further include a first sampling unit 808 configured to sample the sorted Morton codes to obtain Morton codes of K samples, where K is an integer greater than 0.

The first right shift unit 804 is further configured to perform right shift of the Morton codes of the K samples to obtain K samples corresponding to the right-shifted Morton codes.

The first judging unit 803 is further configured to determine whether the K samples corresponding to the right-shifted Morton codes have an average of at least one neighbor node corresponding to each sample; if the K samples corresponding to the right-shifted Morton codes do not have an average of at least one neighbor node corresponding to each sample, act of performing right shift processing on the Morton codes of the K samples continue to be performed; if the K samples corresponding to the right-shifted Morton codes have an average of at least one neighbor node corresponding to each sample, the right shift number of the K samples is acquired, and the right shift number is determined as an initial right shift number of the Morton code of the point in the point cloud to be partitioned; wherein, the initial right shift number represents a right shift number $N_0$ corresponding to Morton codes of points in the 0th LOD layer in the point cloud to be partitioned.

In the above solution, referring to FIG. 8, the encoder 80 may further include a first analyzing unit 809 configured to perform characteristic analysis of the point cloud to be partitioned to determine the value of K.

In the above solution, the first determining unit 802 is further configured to determine a maximum Morton code and a minimum Morton code based on the sorted Morton codes.

The first calculation unit 801 further configured to calculate a difference value between the maximum Morton code and the minimum Morton code.

The first right shift unit 804 is further configured to perform right shift of the difference value, and when the right-shifted difference value meets a preset range, obtain the right shift number of the difference value. The first determining unit 802 is further configured to determine the right shift number as an initial right shift number of the point cloud to be partitioned.

In the above solution, the first determining unit 802 is further configured to determine a right shift number $N_i$ corresponding to the ith LOD layer in the point cloud to be partitioned by using a first preset calculation model when i is not equal to 0.

In the above solution, the first determining unit 802 is specifically configured to obtain the right shift number $N_{i-1}$ corresponding to the (i−1)th LOD layer; superimpose the right shift number $N_{i-1}$ corresponding to the (i−1)th LOD layer with a preset value to obtain a superimposed value; and determine the superimposed value as the right shift number $N_i$ corresponding to the ith LOD layer.

In the above solution, the first analysis unit 809 is further configured to analyze characteristics of the point cloud to be partitioned to determine the preset value.

In the above solution, the preset value is equal to 3.

In the above solution, the first right shift unit 804 is further configured to, based on the right shift number $N_i$ corresponding to the ith LOD layer, perform right shift of the Morton code of the current node in the ith LOD layer.

The first determining unit 802 is further configured to determine the right-shifted Morton code as a Morton code of a parent node corresponding to the current node in the ith LOD layer.

In the above solution, the first determining unit 802 is further configured to determine a Morton code of a neighbor node corresponding to the parent node according to the determined Morton code of the parent node.

The first searching unit 805 is specifically configured to, according to the Morton code of the neighbor node, search a preset storage area for the neighbor node corresponding to the Morton code of the neighbor node.

In the above solution, the first calculation unit 801 is further configured to, according to the determined Morton code of the parent node, calculate Morton codes of all neighbor nodes coplanar, collinear and co-point with the parent node, to obtain Morton codes of a first quantity of neighbor nodes.

The first determining unit 802 specifically configured to compare the Morton codes of the first quantity of neighbor nodes with the Morton code of the current node; discard a Morton code of a neighbor node when the Morton code of the neighbor node is smaller than the Morton code of the current node; reserve a Morton code of a neighbor node when the Morton code of the neighbor node is greater than or equal to the Morton code of the current node, to obtain Morton codes of a second quantity of the neighbor nodes; wherein, the second quantity is less than or equal to the first quantity; and determine the Morton codes of the second quantity of neighbor nodes as the Morton codes of the neighbor nodes corresponding to the parent node.

In the above solution, the first determining unit 802 is further configured to, based on the point cloud to be partitioned, determine an adjacent area corresponding to the current node in the ith LOD layer.

The first calculation unit 801 is further configured to calculate a centroid of the adjacent area and select a node closest to the centroid as a target node from the current node and the first quantity of neighbor nodes.

The first partitioning unit 806 is further configured to partition the target node into the ith LOD layer and partition the remaining nodes into an (i+1)th LOD layer; wherein, the remaining node represents nodes other than the target node among the current node and the first quantity of neighbor nodes.

In the above solution, the first right shift unit 804 is further configured to perform right shift of Morton codes of points of the point cloud to be partitioned to obtain multiple sets; wherein, each set includes a part of the point cloud to be partitioned.

The first partitioning unit 806 is further configured to perform the act of LOD layer partitioning on the part of the point cloud to be partitioned included in each set for each of the multiple sets.

It may be understood that, in this embodiment, a "unit" may be a portion of a circuit, a portion of a processor, a portion of a program or software, etc., or, of course, may be a module, or may be non-modular. In addition, various components in this embodiment may be integrated into one processing unit, or various units may exist physically separately, or two or more than two units may be integrated into one unit. The integrated unit may be implemented in a form of hardware, or may be implemented in a form of a software functional module.

The integrated unit, if implemented in the form of the software functional module and sold or used as an independent product, may be stored in a computer readable storage medium. Based on such understanding, the technical solution of the embodiment, in essence, or a part contributing to the prior art, or all or part of the technical solution, may be embodied in a form of a software product, and the computer software product is stored in a storage medium, and includes several instructions for enabling a computer device (which may be a personal computer, a server, or a network device, etc.) or a processor to perform all or part of the acts of the method in the embodiment. The aforementioned storage medium includes various media, such as a U disk, a mobile hard disk, a Read Only Memory (ROM), a Random Access Memory (RAM), a magnetic disk, or an optical disk, which are capable of storing program codes.

Therefore, the present embodiment provides a computer storage medium applied to the encoder 80. The computer storage medium stores a partition program, and when the partition program is performed by a first processor, the method according to any one of the aforementioned embodiments is implemented.

Figure 9:
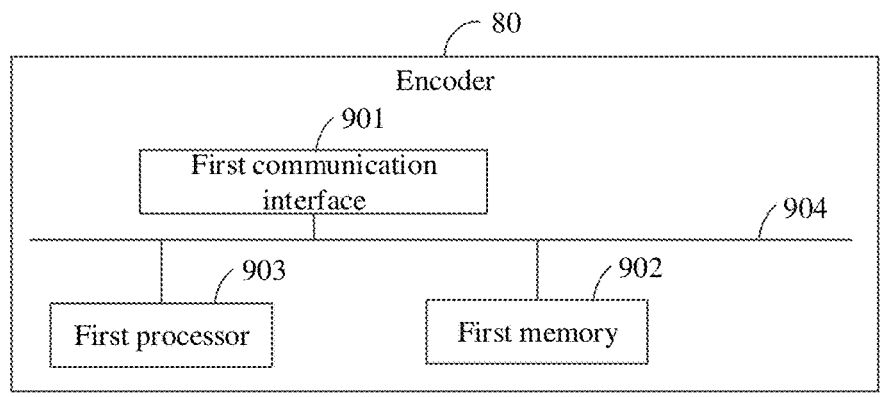
FIG. 9 is a schematic diagram of a specific hardware structure of an encoder according to an embodiment of the present application.

Based on the composition of the encoder 80 and the computer storage medium described above, referring to FIG. 9, FIG. 9 shows a specific hardware structure of an encoder 80 according to an embodiment of the present application. The encoder 80 may include a first communication interface 901, a first memory 902, and a first processor 903 coupled together through a first bus system 904. It may be understood that the first bus system 904 is used for implementing connection and communication between these components. In addition to including a data bus, the first bus system 904 further includes a power bus, a control bus, and a status signal bus. However, for the sake of clarity, various buses are all labeled as the first bus system 904 in FIG. 9.

The first communication interface 901 is configured to receive and send signals in a process of sending and receiving information with other external network elements.

The first memory 902 is configured to store a computer program runnable on the first processor 903.

The first processor 903 is configured to, when running the computer program, cauculate a Morton code of a point of a point cloud to be partitioned according to the point cloud to be partitioned; determine a right shift number $N_i$ corresponding to an ith Level of Detail (LOD) layer in the point cloud to be partitioned, where i is an integer greater than or equal to 0 and $N_i$ is an integer greater than 0; judge whether i is less than or equal to M−1; where M represents a preset quantity of layers of LOD partitioning; when i is less than or equal to M−1, for the ith LOD layer, perform right shift of the Morton code of the point of the point cloud to be partitioned by $N_i$ binary digits, and store the right-shifted Morton code in a preset storage area; determine a Morton code of a parent node corresponding to a current node in the ith LOD layer; according to the determined Morton code of the parent node, search a preset storage area for a neighbor node corresponding to the parent node; partition the current node into the ith LOD layer, and partition the neighbor node into an (i+1)th LOD layer; update i according to i+1, and return to the act of judging whether i is less than or equal to M−1; and when i is greater than M−1, determine an 0th LOD layer to an (M−1)th LOD layer as corresponding partitioned LOD layers of the point cloud to be partitioned.

It may be understood that the first memory 902 in the embodiment of the present application may be a volatile memory or a non-volatile memory, or may include both the volatile memory and the non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM) which serves as an external cache. Through exemplary but non-restrictive description, many forms of RAMs may be available, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDR SDRAM), an Enhanced Synchronous Dynamic Random Access Memory (ESDRAM), a SynchLink Dynamic Random Access Memory (SLDRAM), and a Direct Rambus Random Access Memory (DRRAM). The first memory 902 in the systems and methods described in the present application is intended to include, but not be limited to, these and any other suitable types of memories.

The first processor 903 may be an integrated circuit chip having a signal processing capability. In an implementation process, various acts of the foregoing methods may be completed through an integrated logic circuit of hardware in the first processor 903 or instructions in a form of software. The first processor 903 described above may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. The processor may implement or perform various methods, acts, and logic block diagrams disclosed in the embodiments of the present application. The general purpose processor may be a microprocessor, or the processor may be any conventional processor or the like. The acts of the methods disclosed in connection with the embodiments of the present application may be directly embodied by execution of a hardware decoding processor, or by execution of a combination of hardware and software modules in a decoding processor. The software modules may be located in a storage medium commonly used in the art, such as a random access memory, a flash memory, a read-only memory, a programmable read-only memory or an electrically erasable programmable memory, or a register. The storage medium is located in the first memory 902, and the first processor 903 reads information in the first memory 902 and completes the acts of the foregoing methods in combination with its hardware.

It may be understood that these embodiments described in the present application may be implemented by hardware, software, firmware, middleware, microcode, or a combination thereof. For an implementation by hardware, a processing unit may be implemented in one or more Application Specific Integrated Circuits (ASICs), Digital Signal Processors (DSPs), DSP Devices (DSPDs), Programmable Logic Devices (PLDs), Field-Programmable Gate Arrays (FPGAs), general purpose processors, controllers, microcontrollers, microprocessors, other electronic modules for performing the functions described in the present application, or combinations thereof. For an implementation by software, techniques described in the present application may be implemented through modules (e.g., processes, functions) that perform the functions described in the present application. Software codes may be stored in a memory and performed by a processor. The memory may be implemented in the processor or external to the processor.

Optionally, as another embodiment, the first processor 903 is further configured to perform the method according to any one of the aforementioned embodiments when running the computer program.

The present embodiment provides an encoder, which may include a first calculation unit, a first determining unit, a first judging unit, a first right shift unit, a first searching unit and a first partitioning unit. The first calculation unit is configured to calculate a Morton code of a point of a point cloud to be partitioned based on the point cloud to be partitioned. The first determining unit is configured to determine a right shift number $N_i$ corresponding to an ith Level of Detail (LOD) layer in the point cloud to be partitioned; wherein i is an integer greater than or equal to 0, and $N_i$ is an integer greater than 0. The first judging unit is configured to judge whether i is less than or equal to M−1, where M represents a preset quantity of layers of LOD partitioning. The first right shift unit is configured to, for the ith LOD layer, perform right shift of the Morton code of the point of the point cloud to be partitioned by $N_i$ binary digits when i is less than or equal to M−1, and store the right-shifted Morton code in a preset storage area. The first determining unit is further configured to determine a Morton code of a parent node corresponding to a current node in the ith LOD layer. The first searching unit is configured to search a preset storage area for a neighbor node corresponding to the parent node according to the determined Morton code of the parent node. The first partitioning unit is configured to partition the current node into the ith LOD layer and partition the neighbor node into an (i+1)th LOD layer. The first judging unit is further configured to update i according to i+1, and return to the act of judging whether i is smaller than or equal to M−1. The first determining unit is further configured to determine an 0th LOD layer to an (M−1)th LOD layer as corresponding partitioned LOD layers of the point cloud to be partitioned when i is greater than M−1. Thus, the technical solution of the present application no longer calculates the spatial distances between the current node and the neighbor nodes, but uses Morton codes to search for the neighbor nodes corresponding to the parent node of the current node every time the LOD layer is partitioned. In addition, the current node is used as a sample to predict the neighbor nodes, which reduces the computational complexity. Moreover, since the spatial distribution characteristics of the point cloud are considered, the accuracy of the neighbor node's prediction attribute and the reconstruction quality of the attribute part are also improved, which can effectively reduce the encoding bit overheads and further increase the encoding and decoding efficiency.

Based on the same inventive concept as the foregoing embodiments, referring to FIG. 10, FIG. 10 shows a schematic diagram of a structure of a decoder 100 according to an embodiment of the present application. As shown in FIG. 10, the decoder 100 may include a second calculation unit 1001, a second determining unit 1002, a second judging unit 1003, a second right shift unit 1004, a second searching unit 1005, and a second partitioning unit 1006. The second calculation unit 1001 is configured to calculate a Morton code of a point of a point cloud to be partitioned based on the point cloud to be partitioned.

The second determining unit 1002 is configured to determine a right shift number $N_i$ corresponding to an ith Level of Detail (LOD) layer in the point cloud to be partitioned, where i is an integer greater than or equal to 0 and $N_i$ is an integer greater than 0.

The second judging unit 1003 is configured to judge whether i is less than or equal to M−1, where M represents a preset quantity of layers of LOD partitioning.

The second right shift unit 1004 is configured to, for the ith LOD layer, perform right shift of the Morton code of the point of the point cloud to be partitioned by $N_i$ binary digits when i is less than or equal to M−1, and stores the right-shifted Morton code in a preset storage area.

The second determining unit 1002 is further configured to determine a Morton code of a parent node corresponding to a current node in the ith LOD layer.

The second searching unit 1005 is configured to search a preset storage area for a neighbor node corresponding to the parent node according to the determined Morton code of the parent node.

The second partitioning unit 1006 is configured to partition the current node into the ith LOD layer and partition the neighbor node into an (i+1)th LOD layer.

The second judging unit 1003 is further configured to update i according to i+1 and return to the act of judging whether i is less than or equal to M−1.

The second determining unit 1002 is further configured to determine an 0th LOD layer to an (M−1)th LOD layer as corresponding partitioned LOD layers of the point cloud to be partitioned when i is greater than M−1.

In the above solution, referring to FIG. 10, the decoder 100 may further include a second sorting unit 1007 configured to, according to a preset sorting strategy, sort Morton codes of points of the point cloud to be partitioned, and determine the sorted Morton code as the Morton codes of the points of the point cloud to be partitioned.

In the above solution, referring to FIG. 10, the decoder 100 may further include a second sampling unit 1008 configured to sample the sorted Morton codes to obtain Morton codes of K samples, where K is an integer greater than 0.

The second right shift unit 1004 is further configured to perform right shift of the Morton codes of the K samples to obtain K samples corresponding to the right-shifted Morton codes.

The second judging unit 1003 is further configured to determine whether the K samples corresponding to the right-shifted Morton codes have an average of at least one neighbor node corresponding to each sample; if the K samples corresponding to the right-shifted Morton codes do not have the average of at least one neighbor node corresponding to each sample, continue to perform right shift of the Morton codes of the K samples; if the K samples corresponding to the right-shifted Morton codes have the average of at least one neighbor node corresponding to each sample, acquire the right shift number of the K samples, and determine the right shift number as an initial right shift number of the Morton codes of the points in the point cloud to be partitioned; wherein, the initial right shift number represents the right shift number $N_0$ corresponding to Morton codes of points in the 0th LOD layer in the point cloud to be partitioned.

In the above solution, referring to FIG. 10, the decoder 100 may further include a second analyzing unit 1009 configured to perform characteristic analysis of the point cloud to be partitioned to determine a value of K.

In the above solution, the second determining unit 1002 is further configured to determine a maximum Morton code and a minimum Morton code based on the sorted Morton codes.

The second calculation unit 1001 further configured to calculate a difference value between the maximum Morton code and the minimum Morton code.

The second rightward shift unit 1004 is further configured to perform right shift of the difference value, and when the right-shifted difference value meets a preset range, obtain a right shift number of the difference value.

The second determining unit 1002 is further configured to determine the right shift number as an initial right shift number of the point cloud to be partitioned.

In the above solution, the second determining unit 1002 is further configured to determine a right shift number $N_i$ corresponding to the ith LOD layer in the point cloud to be partitioned by using a first preset calculation model when i is not equal to 0.

In the above solution, the second determining unit 1002 is specifically configured to obtain the right shift number $N_{i-1}$ corresponding to an (i−1)th LOD layer; superimpose the right shift number $N_{i-1}$ corresponding to the (i−1)th LOD layer with a preset value to obtain a superimposed value; and determine the superimposed value as the right shift number $N_i$ corresponding to the ith LOD layer.

In the above solution, the second analysis unit 1009 is further configured to analyze characteristics of the point cloud to be partitioned to determine the preset value.

In the above solution, the preset value is equal to 3.

In the above solution, the second right shift unit 1004 is further configured to, based on the right shift number $N_i$ corresponding to the ith LOD layer, perform right shift of a Morton code of a current node in the ith LOD layer.

The second determining unit 1002 is further configured to determine the right-shifted Morton code as a Morton code of a parent node corresponding to the current node in the ith LOD layer.

In the above solution, the second determining unit 1002 is further configured to determine a Morton code of a neighbor node corresponding to the parent node according to the determined Morton code of the parent node.

The second searching unit 1005 is specifically configured to, according to the Morton code of the neighbor node, search a preset storage area for the neighbor node corresponding to the Morton code of the neighbor node.

In the above solution, the second calculation unit 1001 is further configured to, according to the determined Morton code of the parent node, calculate Morton codes of all neighbor nodes coplanar, collinear and co-point with the parent node, to obtain Morton codes of a first quantity of neighbor nodes.

The second determining unit 1002 specifically configured to compare the Morton codes of the first quantity of neighbor nodes with the Morton code of the current node; discard a Morton code of a neighbor node when the Morton code of the neighbor node is smaller than the Morton code of the current node; reserve a Morton code of a neighbor node when the Morton code of the neighbor node is greater than or equal to the Morton code of the current node, to obtain Morton codes of a second quantity of neighbor nodes; wherein, the second quantity is less than or equal to the first quantity; and determine the Morton codes of the second quantity of the neighbor nodes as the Morton codes of the neighbor nodes corresponding to the parent node.

In the above solution, the second determining unit 1002 is further configured to, based on the point cloud to be partitioned, determine an adjacent area corresponding to the current node in the ith LOD layer.

The second calculation unit 1001 is further configured to calculate a centroid of the adjacent area and select a node closest to the centroid as a target node from the current node and the first quantity of the neighbor nodes.

The second partitioning unit 1006 is further configured to partition the target node into the ith LOD layer and partition the remaining nodes into an (i+1)th LOD layer; wherein, the remaining node represents nodes other than the target node among the current node and the first quantity of neighbor nodes.

In the above solution, the second right shift unit 1004 is further configured to perform right shift of Morton codes of points of the point cloud to be partitioned to obtain multiple sets; wherein, each set includes a part of the point cloud to be partitioned.

The second partitioning unit 1006 is further configured to perform LOD layer partitioning on the part of the point cloud to be partitioned included in each set for each of the multiple sets.

It may be understood that, in this embodiment, a "unit" may be a portion of a circuit, a portion of a processor, a portion of a program or software, etc., or, of course, may be a module, or may be non-modular. In addition, various components in this embodiment may be integrated into one processing unit, or various units may exist physically separately, or two or more than two units may be integrated into one unit. The integrated unit may be implemented in a form of hardware, or may be implemented in a form of a software functional module.

The integrated unit, if implemented in the form of the software functional module and sold or used as an independent product, may be stored in a computer-readable storage medium. Based on such understanding, the present embodiment provides a computer storage medium applied to the decoder 100. The computer storage medium has stored therein a partition program, and when the partition program is performed by a second processor, the method according to any one of the aforementioned embodiments is implemented.

Figure 11:
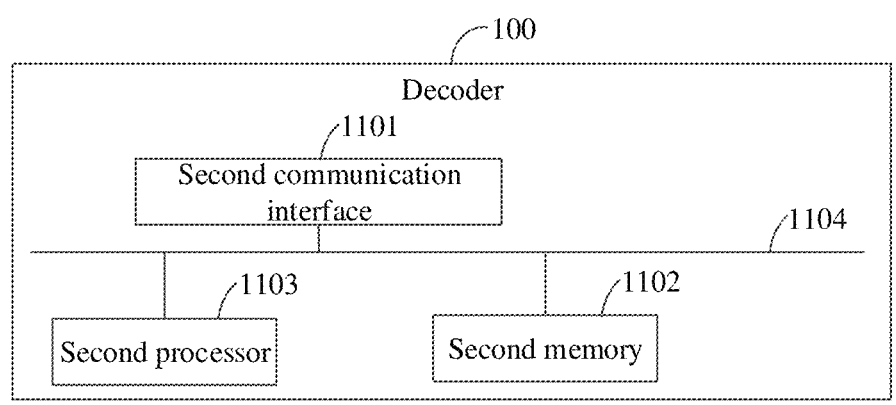
FIG. 11 is a schematic diagram of a specific hardware structure of a decoder according to an embodiment of the present application.

Based on the composition of the decoder 100 and the computer storage medium described above, referring to FIG. 11, FIG. 11 shows a specific hardware structure of a decoder 100 according to an embodiment of the present application. The decoder 100 may include a second communication interface 1101, a second memory 1102, and a second processor 1103 coupled together through a second bus system 1104. It may be understood that the second bus system 1104 is used for implementing connection and communication between these components. In addition to including a data bus, the second bus system 1104 further includes a power bus, a control bus, and a status signal bus. However, for the sake of clarity, various buses are all labeled as the second bus system 1104 in FIG. 11.

The second communication interface 1101 is configured to receive and send signals in a process of sending and receiving information with other external network elements.

The second memory 1102 is configured to store a computer program runnable on the second processor 1103.

The second processor 1103 is configured to, when running the computer program, calculate a Morton code of a point of a point cloud to be partitioned according to the point cloud to be partitioned; determine a right shift number $N_i$ corresponding to an ith Level of Detail (LOD) layer in the point cloud to be partitioned, where i is an integer greater than or equal to 0 and $N_i$ is an integer greater than 0; judge whether i is less than or equal to M−1; where M represents a preset quantity of layers of LOD partitioning; when i is less than or equal to M−1, for the ith LOD layer, perform right shift of the Morton code of the point of the point cloud to be partitioned by $N_i$ binary digits, and store the right-shifted Morton code in a preset storage area; determine a Morton code of a parent node corresponding to a current node in the ith LOD layer; according to the determined Morton code of the parent node, search a preset storage area for a neighbor node corresponding to the parent node; partition the current node into the ith LOD layer, and partition the neighbor node into an (i+1)th LOD layer; update i according to i+1, and return to the act of judging whether i is less than or equal to M−1; and when i is greater than M−1, determine an 0th LOD layer to an (M−1)th LOD layer as corresponding partitioned LOD layers of the point cloud to be partitioned.

Optionally, as another embodiment, the second processor 1103 is further configured to perform the method according to any one of the aforementioned embodiments when running the computer program.

It may be understood that hardware function of the second memory 1102 are similar to that of the first memory 902 and the hardware function of the second processor 1103 are similar to that of the first processor 903, which will not be repeated here.

The embodiment provides a decoder, which may include a second calculation unit, a second determining unit, a second judging unit, a second right shift unit, a second searching unit and a second partitioning unit. The second calculation unit is configured to calculate a Morton code of a point of a point cloud to be partitioned based on the point cloud to be partitioned. The second determining unit is configured to determine a right shift number $N_i$ corresponding to an ith Level of Detail (LOD) layer in the point cloud to be partitioned; wherein i is an integer greater than or equal to 0, and $N_i$ is an integer greater than 0. The second judging unit is configured to judge whether i is less than or equal to M−1, where M represents a preset quantity of layers of LOD partitioning. The second right shift unit is configured to, for the ith LOD layer, perform right shift of the Morton code of the point of the point cloud to be partitioned by $N_i$ binary digits when i is less than or equal to M−1, and store the right-shifted Morton code in a preset storage area. The second determining unit is further configured to determine a Morton code of a parent node corresponding to a current node in the ith LOD layer. The second searching unit is configured to search a preset storage area for a neighbor node corresponding to the parent node according to the determined Morton code of the parent node. The second partitioning unit is configured to partition the current node into the ith LOD layer and partition the neighbor node into an (i+1)th LOD layer. The second judging unit is further configured to update i according to i+1 and return to the act of judging whether i is less than or equal to M−1. The second determining unit is further configured to determine an 0th LOD layer to an (M−1)th LOD layer as corresponding partitioned LOD layers of the point cloud to be partitioned when i is greater than M−1. Thus, the technical solution of the present application no longer calculates the spatial distances between the current node and the neighbor nodes, but uses Morton codes to search for the neighbor nodes corresponding to the parent node of the current node every time the LOD layer is partitioned. In addition, the current node is used as a sample to predict the neighbor nodes, which reduces the computational complexity. Moreover, since the spatial distribution characteristics of the point cloud are considered, the accuracy of the neighbor node's prediction attribute and the reconstruction quality of the attribute part are also improved, which can effectively reduce the encoding bit overheads and further increase the encoding and decoding efficiency.

It should be noted that in the present application, the terms "include", "contain" or any other variations thereof are intended to cover a non-exclusive inclusion, such that a process, method, article, or apparatus that includes a series of elements includes not only those elements but also other elements which are not expressly listed, or further includes elements inherent to such a process, method, article, or apparatus. An element defined by a statement "include one . . . " does not exclude presence of additional identical elements in a process, method, article, or apparatus that includes the element, without more limitations.

The above-mentioned serial numbers of the embodiments of the present application are only for description, and do not represent superiority and inferiority of the embodiments.

The methods disclosed in several method embodiments provided in the present application may be combined with each other randomly if there is no conflict, to obtain new method embodiments.

Features disclosed in several product embodiments provided in the present application may be combined with each other randomly if there is no conflict, to obtain new product embodiments.

Features disclosed in several method or device embodiments provided in the present application may be combined with each other randomly if there is no conflict, to obtain new method embodiments or device embodiments.

The foregoing are merely specific embodiments of the present application, but the protection scope of the present application is not limited thereto. Any person skilled in the art may readily conceive variations or substitutions within the technical scope disclosed by the present application, which should be included within the protection scope of the present application. Therefore, the protection scope of the present application shall be subject to the protection scope of the claims.

INDUSTRIAL APPLICABILITY

In the embodiment of the present application, the method is applied to an encoder. A Morton code of a point of a point cloud to be partitioned is calculated according to the point cloud to be partitioned. A right shift number $N_i$ corresponding to an ith Level of Detail (LOD) layer in the point cloud to be partitioned is determined, where i is an integer greater than or equal to 0, and $N_i$ is an integer greater than 0. Whether i is less than or equal to M−1 is determined, where M represents a preset quantity of layers of LOD partitioning. When i is less than or equal to M−1, for the ith LOD layer, right shift of the Morton code of the point of the point cloud to be partitioned is performed by $N_i$ binary digits, and the right-shifted Morton code is stored in a preset storage area. A Morton code of a parent node corresponding to a current node in the ith LOD layer is determined; according to the determined Morton code of the parent node, a preset storage area is searched for a neighbor node corresponding to the parent node; the current node is partitioned into the ith LOD layer, and the neighbor node is partitioned into an (i+1)th LOD layer. i is updated according to i+1, and it is returned to the act of judging whether i is less than or equal to M−1; and when i is greater than M−1, an 0th LOD layer to an (M−1)th LOD layer are determined as corresponding partitioned LOD layers of the point cloud to be partitioned. Thus, the technical solution of the present application no longer calculates the spatial distances between the current node and the neighbor nodes, but uses Morton codes to search for the neighbor nodes corresponding to the parent node of the current node every time the LOD layer is partitioned. In addition, the current node is used as a sample to predict the neighbor nodes, which reduces the computational complexity. Moreover, since the spatial distribution characteristics of the point cloud are considered, the accuracy of the neighbor node's prediction attribute and the reconstruction quality of the attribute part are also improved, which can effectively reduce the encoding bit overheads and further increase the encoding and decoding efficiency.

The invention claimed is:

1. A partitioning method, applied to an encoder, the method comprising:
    determining, according to a point cloud to be partitioned, location information of a point of the point cloud to be partitioned;
    when i is less than or equal to M−1, determining a right shift number $N_i$ corresponding to an ith Level of Detail (LOD) layer in the point cloud to be partitioned; wherein i is an integer greater than or equal to 0, $N_i$ is an integer greater than 0, and M represents a preset maximum quantity of layers for LOD partitioning;
    for the ith LOD layer, performing right shift of the location information of the point of the point cloud to be partitioned by $N_i$ binary digits, and performing storing in a preset storage area based on the right-shifted location information;
    determining location information of a parent point corresponding to a current point in the ith LOD layer;
    searching, according to the determined location information of the parent point, the preset storage area for a neighbor point corresponding to the parent point;
    partitioning the current point into an (i+1)th LOD layer, or partitioning the neighbor point into the ith LOD layer.

2. The method of claim 1, further comprising:
    sorting, according to a preset sorting strategy, location information of points of the point cloud to be partitioned, and determining the sorted location information as location information of the points of the point cloud to be partitioned.

3. The method of claim 2, further comprising:
    determining, according to the sorted location information, maximum location information and minimum location information;
    calculating a difference value between the maximum location information and the minimum location information;
    performing right shift processing on the difference value, and when the right-shifted difference value meets a preset range, acquiring a right shift number of the difference value; and
    determining the right shift number as the initial right shift number of the point cloud to be partitioned.

4. The method of claim 1, wherein when i is less than or equal to M−1, the determining the right shift number $N_i$ corresponding to the ith LOD layer in the point cloud to be partitioned comprises:

determining the right shift number $N_i$ corresponding to the ith LOD layer in the point cloud to be partitioned by using a first preset calculation model.

5. The method of claim 1, wherein the determining the location information of the parent point corresponding to the current point in the ith LOD layer comprises:
    performing right shift processing on location information of the current point in the ith LOD layer based on the right shift number $N_i$ corresponding to the ith LOD layer; and
    determining the right-shifted location information as the location information of the parent point corresponding to the current point in the ith LOD layer.

6. The method of claim 1, wherein the searching, according to the determined location information of the parent point, the preset storage area for the neighbor point corresponding to the parent point comprises:
    determining, according to the determined location information of the parent point, location information of the neighbor point corresponding to the parent point; and
    searching, according to the location information of the neighbor point, the preset storage area for the neighbor point corresponding to the location information of the neighbor point.

7. The method of claim 6, wherein the determining, according to the determined location information of the parent point, the location information of the neighbor point corresponding to the parent point comprises:
    calculating, according to the determined location information of the parent point, location information of all neighbor points coplanar, collinear and co-point with the parent point, to obtain location information of a first quantity of neighbor points;
    respectively comparing the location information of the first quantity of neighbor points with the location information of the current point;
    discarding location information of a neighbor point when the location information of the neighbor point is smaller than the location information of the current point;
    reserving location information of a neighbor point when the location information of the neighbor point is greater than or equal to the location information of the current point, to obtain location information of a second quantity of neighbor points; wherein the second quantity is less than or equal to the first quantity; and
    determining the location information of the second quantity of neighbor points as location information of neighbor points corresponding to the parent point.

8. The method of claim 1, further comprising:
    when i is greater than M−1, determining an 0th LOD layer to an (M−1)th LOD layer as corresponding partitioned LOD layers of the point cloud to be partitioned.

9. A partitioning method, applied to a decoder, the method comprising:
    determining, according to a point cloud to be partitioned, location information of a point of the point cloud to be partitioned;
    when i is less than or equal to M−1, determining a right shift number $N_i$ corresponding to an ith Level of Detail (LOD) layer in the point cloud to be partitioned; wherein i is an integer greater than or equal to 0, $N_i$ is an integer greater than 0, and M represents a preset maximum quantity of layers for LOD partitioning;
    for the ith LOD layer, performing right shift of the location information of the point of the point cloud to be partitioned by $N_i$ binary digits, and performing storing in a preset storage area based on the right-shifted location information;

determining location information of a parent point corresponding to a current point in the ith LOD layer;

searching, according to the determined location information of the parent point, the preset storage area for a neighbor point corresponding to the parent point;

partitioning the current point into an (i+1)th LOD layer, or partitioning the neighbor point into the ith LOD layer.

10. The method of claim 9, further comprising:

sorting, according to a preset sorting strategy, location information of points of the point cloud to be partitioned, and determining the sorted location information as location information of the points of the point cloud to be partitioned.

11. The method of claim 10, further comprising:

determining, according to the sorted location information, maximum location information and minimum location information;

calculating a difference value between the maximum location information and the minimum location information;

performing right shift processing on the difference value, and when the right-shifted difference value meets a preset range, acquiring a right shift number of the difference value; and determining the right shift number as the initial right shift number of the point cloud to be partitioned.

12. The method of claim 9, wherein when i is less than or equal to M−1, the determining the right shift number $N_i$ corresponding to the ith LOD layer in the point cloud to be partitioned comprises:

determining the right shift number $N_i$ corresponding to the ith LOD layer in the point cloud to be partitioned by using a first preset calculation model.

13. The method of claim 9, wherein the determining the location information of the parent point corresponding to the current point in the ith LOD layer comprises:

performing right shift processing on location information of the current point in the ith LOD layer based on the right shift number $N_i$ corresponding to the ith LOD layer; and determining the right-shifted location information as the location information of the parent point corresponding to the current node in the ith LOD layer.

14. The method of claim 9, wherein the searching, according to the determined location information of the parent point, the preset storage area for the neighbor point corresponding to the parent point comprises:

determining, according to the determined location information of the parent point, location information of the neighbor point corresponding to the parent point; and searching, according to the location information of the neighbor point, the preset storage area for the neighbor point corresponding to the location information of the neighbor point.

15. The method of claim 14, wherein the determining, according to the determined location information of the parent point, the location information of the neighbor point corresponding to the parent point comprises:

calculating, according to the determined location information of the parent point, location information of all neighbor points coplanar, collinear and co-point with the parent point, to obtain location information of a first quantity of neighbor points;

respectively comparing the location information of the first quantity of neighbor points with the location information of the current point;

discarding location information of a neighbor point when the location information of the neighbor point is smaller than the location information of the current point;

reserving location information of a neighbor point when the location information of the neighbor point is greater than or equal to the location information of the current point, to obtain location information of a second quantity of neighbor points; wherein the second quantity is less than or equal to the first quantity; and determining the location information of the second quantity of neighbor points as location information of neighbor points corresponding to the parent point.

16. The method of claim 9, further comprising:

when i is greater than M−1, determining an 0th LOD layer to an (M−1)th LOD layer as corresponding partitioned LOD layers of the point cloud to be partitioned.

17. An encoder, comprising a processor, wherein the processor is configured to perform the following acts:

determining, according to a point cloud to be partitioned, location information of a point of the point cloud to be partitioned;

when i is less than or equal to M−1, determining a right shift number $N_i$ corresponding to an ith Level of Detail (LOD) layer in the point cloud to be partitioned; wherein i is an integer greater than or equal to 0, $N_i$ is an integer greater than 0, and M represents a preset maximum quantity of layers for LOD partitioning;

for the ith LOD layer, performing right shift of the location information of the point of the point cloud to be partitioned by $N_i$ binary digits, and performing storing in a preset storage area based on the right-shifted location information;

determining location information of a parent point corresponding to a current point in the ith LOD layer;

searching, according to the determined location information of the parent point, the preset storage area for a neighbor point corresponding to the parent point;

partitioning the current point into an (i+1)th LOD layer, or partitioning the neighbor point into the ith LOD layer.

18. A decoder, comprising a second memory and a second processor, wherein the second memory is configured to store a computer program runnable on the second processor; and the second processor is configured to perform the method of claim 9 when running the computer program.

* * * * *